US012687796B2

(12) United States Patent
Kitamura et al.

(10) Patent No.: US 12,687,796 B2
(45) Date of Patent: Jul. 21, 2026

(54) TONER, TONER PRODUCTION METHOD, AND TWO-COMPONENT DEVELOPER

(71) Applicant: CANON KABUSHIKI KAISHA, Tokyo (JP)

(72) Inventors: Shin Kitamura, Ibaraki (JP); Toru Takahashi, Ibaraki (JP); Daisuke Tsujimoto, Tokyo (JP); Ryuichiro Matsuo, Ibaraki (JP); Ryuji Murayama, Chiba (JP); Hitoshi Sano, Chiba (JP); Nobuyuki Fujita, Tokyo (JP); Shuji Yamada, Chiba (JP); Yuka Gunji, Ibaraki (JP); Takakuni Kobori, Ibaraki (JP); Yoshihiro Ogawa, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 482 days.

(21) Appl. No.: 18/307,827

(22) Filed: Apr. 27, 2023

(65) Prior Publication Data

US 2023/0408943 A1 Dec. 21, 2023

(30) Foreign Application Priority Data

Apr. 28, 2022 (JP) ................................ 2022-075102

(51) Int. Cl.

*G03G 9/08* (2006.01)
*G03G 9/097* (2006.01)
*G03G 9/113* (2006.01)

(52) U.S. Cl.

CPC ....... *G03G 9/09716* (2013.01); *G03G 9/0808* (2013.01); *G03G 9/0819* (2013.01); *G03G 9/09725* (2013.01); *G03G 9/1133* (2013.01)

(58) Field of Classification Search

CPC .. G03G 9/0971; G03G 9/0808; G03G 9/0819; G03G 9/09725; G03G 9/1133
See application file for complete search history.

(56) References Cited

U.S. PATENT DOCUMENTS 5,641,601 A 6/1997 Mitani et al.
5,686,054 A 11/1997 Barthel et al.
(Continued)

FOREIGN PATENT DOCUMENTS

EP 2 799 929 A1 11/2014
EP 2 853 945 A1 4/2015
(Continued)

OTHER PUBLICATIONS

U.S. Appl. No. 18/173,255, Takayuki Toyoda, filed Feb. 23, 2023
(Continued)

*Primary Examiner* — Mark F. Huff
*Assistant Examiner* — Charles Collins Sullivan, IV
(74) *Attorney, Agent, or Firm* — VENABLE LLP

(57) ABSTRACT

A toner comprising a toner particle and a silica fine particle A on a surface of the toner particle, wherein: a weight-average particle diameter of the toner is 4.0 to 15.0 μm; the silica fine particle A is a treated silica fine particle having been surface-treated; and areas of each peak which is obtained by a solid-state DD/MAS $^{29}$Si-NMR measurement of the silica fine particle A and the silica fine particle A after washing thereof with hexane is in a specific range, and a full width at half maximum of the peak which is obtained by a solid-state DD/MAS $^{29}$Si-NMR measurement of the silica fine particle A is in a specific range.

17 Claims, 2 Drawing Sheets

(56) References Cited

U.S. PATENT DOCUMENTS 5,981,131 A 11/1999 Hirama et al.
6,287,739 B1 9/2001 Kawakami et al.
7,001,703 B2 2/2006 Moribe
7,097,951 B2 8/2006 Moribe
7,123,862 B2 10/2006 Hasegawa
7,147,981 B2 12/2006 Fujikawa
7,267,919 B2 9/2007 Moribe
7,279,262 B2 10/2007 Fujikawa
7,368,211 B2 5/2008 Hasegawa
7,402,368 B2 * 7/2008 Ogawa .................. C09C 1/3081 430/108.7
7,422,832 B2 9/2008 Ogawa
7,470,494 B2 12/2008 Nishiyama
7,582,401 B2 9/2009 Ogawa
7,678,523 B2 3/2010 Hiroko
7,678,524 B2 3/2010 Hasegawa
7,704,659 B2 4/2010 Ogawa
7,811,734 B2 10/2010 Ogawa
7,855,042 B2 12/2010 Kobori
7,923,190 B2 4/2011 Magome
7,935,467 B2 5/2011 Dojo
7,939,231 B2 5/2011 Ogawa
8,084,174 B2 12/2011 Hasegawa
8,124,306 B2 2/2012 Hirata
8,227,162 B2 7/2012 Sano
8,426,091 B2 4/2013 Magome
8,426,094 B2 4/2013 Magome
8,501,377 B2 8/2013 Takahashi
8,512,925 B2 8/2013 Moribe
8,518,620 B2 8/2013 Dojo
8,614,044 B2 12/2013 Matsui
8,778,585 B2 7/2014 Matsui
8,841,054 B2 9/2014 Dojo
9,046,800 B2 6/2015 Hotta
9,097,998 B2 8/2015 Yamazaki
9,128,400 B2 9/2015 Takahashi
9,152,065 B2 10/2015 Sano
9,152,088 B1 10/2015 Kobori
9,158,217 B2 10/2015 Takahashi
9,229,345 B2 1/2016 Ikeda
9,235,151 B2 1/2016 Tanaka
9,348,253 B2 5/2016 Kanno
9,372,420 B2 6/2016 Mizo
9,377,708 B2 6/2016 Magome
9,417,540 B2 8/2016 Hashimoto
9,423,708 B2 8/2016 Tominaga et al.
9,436,112 B2 9/2016 Iwasaki
9,454,094 B2 9/2016 Tsujimoto
9,551,947 B2 1/2017 Hiroko
9,606,466 B2 3/2017 Takahashi
9,651,883 B2 5/2017 Hama
9,665,021 B2 5/2017 Ohtsu
9,665,023 B2 5/2017 Kamae
9,665,026 B2 5/2017 Iwasaki
9,671,707 B2 6/2017 Minagawa
9,703,216 B2 7/2017 Tsuchida
9,785,068 B2 10/2017 Umeda
9,804,514 B2 10/2017 Suzumura
9,804,519 B2 10/2017 Suzumura
9,829,816 B2 11/2017 Tanaka
9,841,692 B2 12/2017 Hasegawa
9,880,478 B2 1/2018 Shimano
9,897,934 B2 2/2018 Tamura
9,915,885 B2 3/2018 Katsumata
9,927,728 B2 3/2018 Arimura
9,946,179 B2 4/2018 Arimura
9,946,181 B2 4/2018 Hasegawa
9,964,874 B2 5/2018 Suzumura
9,964,881 B2 5/2018 Ikejiri
9,969,834 B2 5/2018 Ohtsu
9,971,262 B2 5/2018 Hasegawa
9,971,264 B2 5/2018 Sano
10,012,918 B2 7/2018 Ishigami
10,012,920 B2 7/2018 Shibata
10,012,921 B2 7/2018 Kamae
10,012,923 B2 7/2018 Sano
10,036,970 B2 7/2018 Kanno
10,078,281 B2 9/2018 Ida
10,082,743 B2 9/2018 Hama
10,088,765 B2 10/2018 Miyakai
10,114,303 B2 10/2018 Katsura
10,133,201 B2 11/2018 Kamae
10,146,146 B2 12/2018 Komatsu
10,151,990 B2 12/2018 Suzuki
10,175,595 B2 1/2019 Onozaki
10,197,936 B2 2/2019 Onozaki
10,203,619 B2 2/2019 Yamashita
10,216,108 B2 2/2019 Iwasaki
10,228,627 B2 3/2019 Nagashima
10,228,629 B2 3/2019 Tamura
10,234,777 B2 3/2019 Ohtsu
10,295,920 B2 5/2019 Nishikawa
10,303,075 B2 5/2019 Tanaka
10,310,397 B2 6/2019 Sano
10,353,312 B2 7/2019 Kamae
10,401,748 B2 9/2019 Hashimoto
10,423,090 B2 9/2019 Ohtsu
10,451,985 B2 10/2019 Takahashi
10,451,986 B2 10/2019 Sano
10,451,990 B2 10/2019 Kamae
10,474,049 B2 11/2019 Onozaki
10,514,624 B2 12/2019 Tamura
10,545,420 B2 1/2020 Kinumatsu
10,551,759 B2 2/2020 Watanabe
10,564,560 B2 2/2020 Onozaki et al.
10,642,178 B2 5/2020 Yamashita
10,698,327 B2 6/2020 Nagashima
10,747,132 B2 8/2020 Takahashi
10,768,543 B2 9/2020 Tsujimoto
10,775,710 B1 9/2020 Kamae
10,782,623 B2 9/2020 Yoshiba et al.
10,838,317 B2 11/2020 Sugahara
10,859,935 B2 12/2020 Ohtsu
10,859,936 B2 12/2020 Sugahara
10,877,386 B2 12/2020 Murayama
10,877,391 B2 12/2020 Matsuo
10,935,902 B2 3/2021 Kanno
10,955,765 B2 3/2021 Onozaki
10,969,704 B2 4/2021 Kagawa
11,079,695 B2 8/2021 Sato
11,099,493 B2 8/2021 Komiya
11,112,709 B2 9/2021 Saeki
11,112,713 B2 9/2021 Akiyama
11,131,938 B2 9/2021 Murayama
11,181,844 B2 11/2021 Nagaoka
11,249,410 B2 2/2022 Takahashi
11,415,902 B2 8/2022 Watanabe
11,429,032 B2 8/2022 Shibata
11,448,980 B2 9/2022 Matsui
11,531,284 B2 12/2022 Iguchi et al.
11,698,594 B2 7/2023 Takahashi
2003/0031946 A1 2/2003 Sugiura et al.
2006/0067867 A1 * 3/2006 Ishibashi .................. C09D 7/62 423/335
2010/0273103 A1 * 10/2010 Baba .................... G03G 9/0827 430/110.4
2011/0311910 A1 12/2011 Matsui et al.
2012/0107741 A1 5/2012 Hiraoka et al.
2013/0296578 A1 11/2013 Amano et al.
2014/0377696 A1 * 12/2014 Hasegawa ................ G03G 9/08 430/108.3
2015/0185644 A1 7/2015 Matsui
2015/0378274 A1 12/2015 Abe et al.
2018/0074421 A1 3/2018 Uchino
2018/0246430 A1 8/2018 Tanaka et al.
2019/0113858 A1 4/2019 Kamae et al.
2019/0137902 A1 5/2019 Shibata
2021/0055668 A1 2/2021 Tamura
2021/0255557 A1 8/2021 Watanabe
2021/0286282 A1 9/2021 Kobori
2021/0302853 A1 9/2021 Murata
2021/0302854 A1 9/2021 Kitamura
2021/0302855 A1 9/2021 Torii
2021/0302856 A1 9/2021 Nagashima

(56) References Cited

U.S. PATENT DOCUMENTS

| | | | |
|---|---|---|---|
| 2021/0397106 | A1 | 12/2021 | Kobori |
| 2022/0026822 | A1 | 1/2022 | Sato |
| 2022/0026823 | A1 | 1/2022 | Sano |
| 2022/0050398 | A1 | 2/2022 | Ooyama |
| 2022/0128916 | A1 | 4/2022 | Yoshida |
| 2022/0171302 | A1 | 6/2022 | Sato |
| 2022/0171303 | A1 | 6/2022 | Hiramatsu |
| 2022/0252995 | A1 | 8/2022 | Tsujimoto |
| 2022/0326633 | A1 | 10/2022 | Aoki |
| 2022/0373906 | A1 | 11/2022 | Ohmori |
| 2022/0373911 | A1 | 11/2022 | Kamae |
| 2022/0373919 | A1 | 11/2022 | Imura |
| 2023/0014130 | A1 | 1/2023 | Sano |
| 2023/0122974 | A1 | 4/2023 | Kagawa |
| 2023/0152725 | A1 | 5/2023 | Ochi |
| 2023/0408946 | A1 | 12/2023 | Sato et al. |

FOREIGN PATENT DOCUMENTS

| | | | |
|---|---|---|---|
| JP | 7-330324 | A | 12/1995 |
| JP | 9-204065 | A | 8/1997 |
| JP | 11-174727 | A | 7/1999 |
| JP | 2000-147831 | A | 5/2000 |
| JP | 2002-23413 | A | 1/2002 |
| JP | 2002-139862 | A | 5/2002 |
| JP | 2002-182423 | A | 6/2002 |
| JP | 2002-256173 | A | 9/2002 |
| JP | 2004-126249 | A | 4/2004 |
| JP | 2004-126251 | A | 4/2004 |
| JP | 2007-114630 | A | 5/2007 |
| JP | 2007-176747 | A | 7/2007 |
| JP | 2008-145490 | A | 6/2008 |
| JP | 2009-31426 | A | 2/2009 |
| JP | 2009-271394 | A | 11/2009 |
| JP | 2009-276643 | A | 11/2009 |
| JP | 2012-236752 | A | 12/2012 |
| JP | 2015-11070 | A | 1/2015 |
| JP | 2016-66049 | A | 4/2016 |
| JP | 2016-167029 | A | 9/2016 |
| JP | 2019-3082 | A | 1/2019 |
| JP | 2019-86705 | A | 6/2019 |
| JP | 2019-109416 | A | 7/2019 |
| JP | 2020-91471 | A | 6/2020 |
| JP | 2020-95081 | A | 6/2020 |
| JP | 2020-154294 | A | 9/2020 |
| JP | 2021-148999 | A | 9/2021 |
| WO | 2004060803 | A1 | 7/2004 |

OTHER PUBLICATIONS

U.S. Appl. No. 18/307,825, Hiroki Kagawa, filed Apr. 27, 2023.
U.S. Appl. No. 18/307,826, Ryuichiro Matsuo, filed Apr. 27, 2023.
U.S. Appl. No. 18/307,828, Daisuke Tsujimoto, filed Apr. 27, 2023.
U.S. Appl. No. 18/307,829, Kazuyuki Sato, filed Apr. 27, 2023.
U.S. Appl. No. 18/307,832, Shohei Shibahara, filed Apr. 27, 2023.
ECHA REACH Registration Dossier, https://echa.europa.eu/registration-dossier/-/registered-dossier/15289/4/13.

* cited by examiner

TONER, TONER PRODUCTION METHOD, AND TWO-COMPONENT DEVELOPER

BACKGROUND OF THE INVENTION

Field of the Invention

The present disclosure relates to a toner and two-component developer for developing the electrostatic image that is used in, for example, electrophotographic methods and electrostatic recording methods, and also relates to a toner production method.

Description of the Related Art

Electrophotographic system-based full-color copiers have in recent years become widespread and are beginning to be applied to the print market. The print market requires that a wide range of media (paper types) be accommodated while also requiring high speeds, high image qualities, and high productivities achieved through extended continuous operation.

Stabilization of the toner charging characteristics is necessary in order to boost image quality. Various investigations of external additives have been carried out in pursuit of stabilization of toner charging characteristics. For example, Japanese Patent Application Laid-Open No. 2016-167029 discloses a toner having improved charging characteristics as achieved by the external addition of silica particles that have been surface-treated with cyclic siloxane. Japanese Patent Application Laid-Open No. 2009-031426 discloses a toner having cyclic siloxane at the surface.

SUMMARY OF THE INVENTION

However, in order to reach even higher levels with regard to higher speeds, higher image qualities, and higher productivities achieved through extended continuous operation, a low environmental dependence and in addition a high temporal stability are required with regard to the toner charging performance. That is, a high charge stability is required.

The toners disclosed in Japanese Patent Application Laid-Open Nos. 2016-167029 and 2009-031426 have been inadequate with regard to simultaneously achieving a low environmental dependence for the charging performance and a high temporal stability for the charging performance.

The present disclosure provides a toner that exhibits a low environmental dependence for the charging performance and a high temporal stability for the charging performance. The present disclosure also provides a toner that exhibits little change in image density even when the environment changes and that can suppress changes in image density during continuous printing.

The present disclosure relates to a toner comprising a toner particle and a silica fine particle A on a surface of the toner particle, wherein:

- a weight-average particle diameter of the toner is 4.0 to 15.0 μm;
- the silica fine particle A is a treated silica fine particle having been surface-treated; and
- upon measuring, in a solid-state DD/MAS $^{29}$Si-NMR measurement of the silica fine particle A, a peak PD1 corresponding to a silicon atom indicated by $Si^a$ in a structure given by Formula (1), a peak PD2 corresponding to a silicon atom indicated by $Si^b$ in a structure given by Formula (2), and a peak PQ corresponding to a silicon atom indicated by $Si^c$ in a structure given by Formula (3), and letting SD1 be an area of the peak PD1, SD2 be an area of the peak PD2, and SQ be an area of the peak PQ, and
- upon measuring, in a solid-state DD/MAS $^{29}$Si-NMR measurement of the silica fine particle A after washing thereof with hexane, a peak PD1w corresponding to a silicon atom indicated by $Si^a$ in a structure given by Formula (1), a peak PD2w corresponding to a silicon atom indicated by $Si^b$ in a structure given by Formula (2), and a peak PQw corresponding to a silicon atom indicated by $Si^c$ in a structure given by Formula (3), and letting SD1w be an area of the peak PD1w, SD2w be an area of the peak PD2w, and SQw be an area of the peak PQw,
- SD1 and SD2 satisfy $1.2 \le (SD1+SD2)/SD1 \le 3.8$,
- WD2 is 0.1 to 6.0 ppm where WD2 is a full width at half maximum of the peak PD2, and
- Formula (c) is satisfied by Ca calculated with Formula (a) using SD1, SD2, and SQ, and Cb calculated with Formula (b) using SD1w, SD2w, and SQw $$Ca = (SD1 + SD2)/SQ \times 100 \quad (a)$$

$$Cb = (SD1w + SD2w)/SQw \times 100 \quad (b)$$

$$(Ca - Cb)/Ca \times 100 \le 5.0 \quad (c)$$

(1)

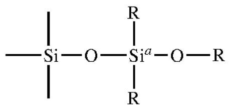

(2)

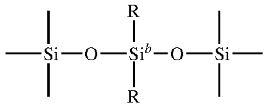

(3)

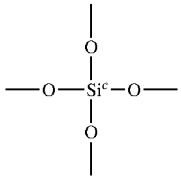

- in formulas (1) and (2), each R is independently a hydrogen atom, methyl group, or ethyl group.

The present disclosure is thus able to provide a toner that exhibits a low environmental dependence for the charging performance and a high temporal stability for the charging performance. The present disclosure is also able to provide a toner that exhibits little fluctuation in image density even when the environment changes and that can suppress changes in image density during continuous printing. Further features of the present invention will become apparent from the following description of exemplary embodiments with reference to the attached drawings.

DESCRIPTION OF THE EMBODIMENTS

Figure 1:
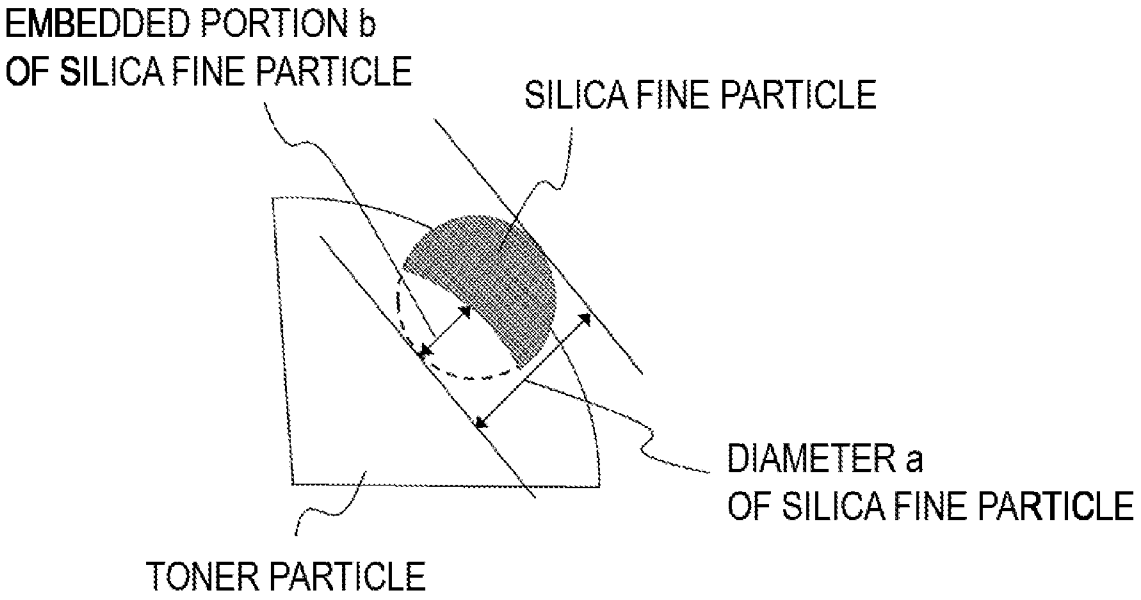
FIG. 1 is a schematic diagram that explains the embedding ratio.

Unless specifically indicated otherwise, in the present disclosure the expressions "from XX to YY" and "XX to YY" that show numerical value ranges refer to numerical value ranges that include the lower limit and upper limit that are the end points. When numerical value ranges are provided in stages, the upper limits and lower limits of the individual numerical value ranges may be combined in any combination. In addition, monomer unit refers to the reacted form of the monomer substance in the polymer.

As a result of carrying out investigations with the goal of improving the charge stability of toner, the present inventors discovered that an excellent charge stability—one not heretofore seen—is obtained through the use of the toner described herebelow.

The excellent charge stability referenced here denotes the following: there is little change in the charging performance when the temperature and humidity of the use environment fluctuate, i.e., the charging performance has a low environmental dependence; also, little time is required until the desired charge quantity is reached at the start of printing and the charge stabilizes. It also denotes that excess charging is not produced even during extended continuous printing at a low print percentage, e.g., documents for which there is a low toner density on the paper surface.

That is, the present disclosure relates to a toner comprising a toner particle and a silica fine particle A on a surface of the toner particle, wherein:

a weight-average particle diameter of the toner is 4.0 to 15.0 μm;

the silica fine particle A is a treated silica fine particle having been surface-treated; and upon measuring, in a solid-state DD/MAS $^{29}$Si-NMR measurement of the silica fine particle A, a peak PD1 corresponding to a silicon atom indicated by $Si^a$ in a structure given by Formula (1), a peak PD2 corresponding to a silicon atom indicated by $Si^b$ in a structure given by Formula (2), and a peak PQ corresponding to a silicon atom indicated by $Si^c$ in a structure given by Formula (3), and letting SD1 be an area of the peak PD1, SD2 be an area of the peak PD2, and SQ be an area of the peak PQ, and upon measuring, in a solid-state DD/MAS $^{29}$Si-NMR measurement of the silica fine particle A after washing thereof with hexane, a peak PD1w corresponding to a silicon atom indicated by $Si^a$ in a structure given by Formula (1), a peak PD2w corresponding to a silicon atom indicated by $Si^b$ in a structure given by Formula (2), and a peak PQw corresponding to a silicon atom indicated by $Si^c$ in a structure given by Formula (3), and letting SD1w be an area of the peak PD1w, SD2w be an area of the peak PD2w, and SQw be an area of the peak PQw, SD1 and SD2 satisfy $1.2 \leq (SD1+SD2)/SD1 \leq 3.8$, WD2 is 0.1 to 6.0 ppm where WD2 is a full width at half maximum of the peak PD2, and Formula (c) is satisfied by Ca calculated with Formula (a) using SD1, SD2, and SQ, and Cb calculated with Formula (b) using SD1w, SD2w, and SQw $$Ca = (SD1 + SD2)/SQ \times 100 \quad (a)$$

-continued $$Cb = (SD1w + SD2w)/SQw \times 100 \quad (b)$$

$$(Ca - Cb)/Ca \times 100 \leq 5.0 \quad (c)$$

(1)

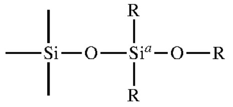

(2)

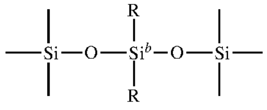

(3)

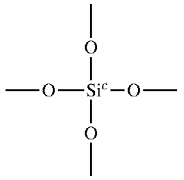

in formulas (1) and (2), each R is independently a hydrogen atom, methyl group, or ethyl group.

The reasons for the occurrence of the effects according to the present disclosure are thought to be as follows.

The factors governing the charge stability of toner are thought to be the ease of generation of charge at the toner surface and the ease of movement of this charge. It is also thought that a large contribution to the charging performance of toner is made by the charge status of the surface of the external additive that is present at the toner particle surface and which is in direct contact with the development member and with other toner. Upon carrying out investigations, the present inventors came to the realization that the charge status of the external additive surface is substantially affected by the terminal structure of molecules present at the external additive surface.

The present inventors discovered that an excellent charge stability—one not heretofore seen—is obtained when the toner particle surface is provided with a silica fine particle A that has a siloxane chain that: is chemically bonded to the surface of the silica fine particle substrate, has the polar O—R group (R=hydrogen atom, methyl group, or ethyl group) in terminal position, and is of appropriate length. The mechanisms thought to underlie this are described in detail in the following.

Charge is rapidly produced due to the presence of the polar O—R group in terminal position on the siloxane chain chemically bonded to the surface of the silica substrate of the silica fine particle A. Moreover, the hydrophobicity possessed by the siloxane chain serves to suppress large changes in the amount of moisture adsorption at the toner surface when the humidity in the operating environment fluctuates. As a result, the ease of charge generation and the ease of charge movement are held constant and the charge status is stabilized. In addition, when the polar O—R group present in terminal position on the siloxane chain exhibits a suitable polarity, an appropriate balance is assumed for the ease of charge generation and the ease of charge movement and the charge status is stabilized.

The magnitude of the polarity of the polar O—R group present in terminal position on the siloxane chain is related to the length of the siloxane chain, which corresponds to the distance to the polar O—R group from the surface of the silica substrate for the silica fine particle A. When the siloxane chain length is in a certain range, the polar O—R group assumes a suitable polarity and a suitable balance is assumed for the ease of charge generation and the ease of charge movement.

When the siloxane chain is short and the distance between the polar O—R group and the silica substrate surface is too short, the polarity is high and a tendency is assumed for the generated charge to be localized. When, on the other hand, the siloxane chain is long and the distance between the polar O—R group and the silica substrate surface is too large, the polarity is low and the generation of the required quantity of charge is then impeded and the charge quantity is then prone to be inadequate.

Here, the average length of the siloxane chain can be represented, using solid-state DD/MAS $^{29}$Si-NMR measurement, by (SD1+SD2)/SD1 from the area (SD1) of the peak corresponding to the silicon atom indicated by $Si^a$ in the structure given by Formula (1) and the area (SD2) of the peak corresponding to the silicon atom indicated by $Si^b$ in the structure given by Formula (2). The "silicon atom indicated by $Si^a$ in the structure given by Formula (1)" is, put differently, a silicon atom having the D1 unit structure, and the "silicon atom indicated by $Si^b$ in the structure given by Formula (2)" is, put differently, a silicon atom having the D2 unit structure.

That is, for the silica fine particle A, a peak (PD1) corresponding to the silicon atom indicated by $Si^a$ in the structure given by Formula (1) and a peak (PD2) corresponding to the silicon atom indicated by $Si^b$ in the structure given by Formula (2) are measured in a solid-state DD/MAS $^{29}$Si-NMR measurement of the silica fine particle A. Further, letting SD1 be the area of the peak PD1, and SD2 be the area of the peak PD2, (SD1+SD2)/SD1 is 1.2 to 3.8.

(SD1+SD2)/SD1 is preferably 1.4 to 3.6, more preferably 1.5 to 3.0, and still more preferably 2.0 to 2.9.

When (SD1+SD2)/SD1 is in the indicated range, the required quantity of charge can be rapidly generated, localization of the generated charge does not occur, suitable diffusion into the surroundings is made possible, and charge migration readily occurs, and this range is thus preferred.

The value of (SD1+SD2)/SD1 can be adjusted, e.g., by changing the species of the siloxane bond-containing surface treatment agent, by changing the surface treatment temperature and time, and so forth.

Since, as noted above, the length of the siloxane chain is related to the polarity of the polar O—R group, a narrow siloxane chain length distribution is preferred from the standpoint of the uniformity of the charge status. When, in the solid-state DD/MAS $^{29}$Si-NMR measurement of the silica fine particle A, the value of (SD1+SD2)/SD1, which represents the average siloxane chain length, is in the range from 1.2 to 3.8, the full width at half maximum (also referred to herebelow as WD2) of the peak (PD2) corresponding to the silicon atom having the D2 unit structure is then an indicator of the siloxane chain length distribution.

The reason why WD2 is an indicator of the siloxane chain distribution is discussed below.

Thus, with respect to the silica fine particle A, WD2 is 0.1 to 6.0 ppm where WD2 is the full width at half maximum of the aforementioned PD2 peak in the solid-state DD/MAS $^{29}$Si-NMR measurement of the silica fine particle A.

In addition, WD2 is preferably 1.0 ppm to 5.1 ppm, more preferably 1.0 ppm to 4.0 ppm, and still more preferably 2.0 ppm to 4.0 ppm.

A WD2 in the aforementioned range indicates that the siloxane chain length distribution is narrow, and an excellent uniformity for the charge status is provided by having WD2 be in the aforementioned range. WD2 can be adjusted as appropriate using the methods described below, e.g., bringing a vapor of the surface treatment agent into contact with the silica fine particle substrate, adjusting the amount and species of the surface treatment agent, and so forth.

The reason why WD2 is an indicator of the siloxane chain length distribution will now be considered. When the value of (SD1+SD2)/SD1 is in the range of 1.2 to 3.8, a shorter siloxane chain length and a lower molecular weight correspond to a shorter time in which energy can transfer between siloxane chains in the solid-state $^{29}$Si-NMR measurement of the silica fine particle A and to a longer time until relaxation from the energy-excited state to the normal state. The value of WD2 is smaller as a result. Conversely, when long-chain-length siloxane chains are present, WD2 has a larger value. Using an extreme example for the sake of discussion, the value of WD2 is larger for the case in which a component with a chain length of 1 and a component with a chain length of 5 are present in a constituent ratio of equal amounts, than for the case in which all the siloxane chains have a chain length of 3.

By having (SD1+SD2)/SD1 be in the indicated range and WD2 be in the indicated range, a toner is provided that exhibits an excellent charge status, a low environmental dependence for the charging performance, and a high temporal stability for the charging performance. As a result, little fluctuation occurs in the image density even when the environment changes and changes in the image density during continuous printing can be suppressed.

In addition, siloxane chains chemically bonded to the silica fine particle substrate are preferably present at the surface of the silica fine particle substrate, and such siloxane chains are preferably present to a satisfactory extent.

The amount of siloxane chain occurrence can be expressed as follows using the results of solid-state DD/MAS $^{29}$Si-NMR measurement. Using SD1, SD2, and SQ where, in the solid-state DD/MAS $^{29}$Si-NMR measurement, SQ is the area of the peak (PQ) corresponding to the silicon atom indicated by $Si^c$ in the structure given by Formula (3) below, the amount of siloxane chain occurrence (Ca) is given by Formula (a).

$$Ca = (SD1 + SD2)/SQ \times 100 \quad \text{(a)}$$

(3)

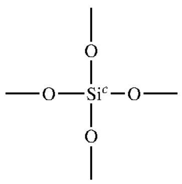

With respect to the silica fine particle A. the Ca is preferably 1.0 or more. Ca is more preferably 4.0 or more and is still more preferably 5.0 or more. With respect to the upper limit for this amount of occurrence, considering that a surface treatment is involved, the Ca is not more than 30.0.

The "silicon atom indicated by $Si^c$ in the structure given by Formula (3)" is, put differently, a silicon atom having the Q unit structure, and Formula (a) denotes the proportion of the amount of silicon atom having the D unit structure with reference to the amount of silicon atom having the Q unit structure. The silicon atoms in the silica fine particle substrate have the Q unit structure, while silicon atoms with the D unit structure are almost entirely absent. Due to this, it is thought that silicon atoms with the D unit structure derive from the surface treatment agent, and the aforementioned proportion represents the amount of siloxane chain originating with the surface treatment.

Chemical bonding of the siloxane chains to the surface of the silica fine particle can be verified by washing the silica fine particle with a solvent (for example, hexane) and confirming that there has been little change in the amount of treatment agent pre-versus-post-washing.

The specific confirmation method is as follows.

1.0 g of the silica fine particle is weighed into a 50-mL screw-cap vial and 20 mL of normal-hexane is added. This is followed by extraction for 10 minutes using an ultrasound homogenizer (VP-050 from the TAITEC Corporation) at an intensity of 20 (10 W output). The resulting extract is separated using a centrifugal separator, the supernatant is removed, and the resulting moist sample is subjected to evaporative removal of the normal-hexane using an evaporator to obtain a post-hexane-wash silica fine particle.

The following are obtained by carrying out a solid-state DD/MAS $^{29}$Si-NMR measurement using the post-hexane-wash silica fine particle A: the area SD1w of the peak PD1w corresponding to the silicon atom indicated by $Si^a$ in the structure given by Formula (1), the area SD2w of the peak PD2w corresponding to the silicon atom indicated by $Si^b$ in the structure given by Formula (2), and the area SQw of the peak PQw corresponding to the silicon atom indicated by $Si^c$ in the structure given by Formula (3). Using the resulting area SD1w, area SD2w, and area SQw, the amount of siloxane chain occurrence post-hexane wash (Cb) is calculated with the Formula (b).

$$Cb=(SD1w+SD2w)/SQw\times 100 \quad (b)$$

The reduction ratio ΔC in the amount of siloxane chain occurrence post-hexane wash relative to that pre-hexane wash is determined using this Ca and Cb and the Formula (c1).

$$\Delta C(\%)=(Ca-Cb)/Ca\times 100 \quad (c1)$$

This reduction ratio ΔC is considered to be the proportion for the amount of siloxane chain not chemically bonded to the silica fine particle surface, relative to the amount of siloxane chain present at the surface of the silica fine particle substrate, and it is not more than 5.0% in the present invention. That is, Ca and Cb satisfy the Formula (c).

$$(Ca-Cb)/Ca\times 100\leq 5.0 \quad (c)$$

The reduction ratio ΔC is preferably 0.0 to 5.0%, more preferably 0.0 to 3.0%, and still more preferably 0.0 to 1.0%.

When the silica fine particle A must be separated from the toner particle when these properties are measured on the silica fine particle A, measurement can be carried out after separation by the method described below. Since separation in an aqueous medium is carried out in the separation method described below, silicon compound elution into the medium does not occur. As a result, separation of the silica fine particle A from a toner particle can be carried out with the properties of the silica fine particle A prior to the separation step being retained as such. Due to this, the values of the various properties measured using the silica fine particle A separated from a toner particle are substantially the same as the values of the various properties measured using the silica fine particle A prior to external addition.

Method for Measuring the Solid-State $^{29}$Si-NMR

The conditions in the solid-state $^{29}$Si-NMR measurement are specifically as follows.

Instrument: JNM-ECA400 (JEOL RESONANCE)
Calibration: tetramethylsilane (TMS) for 0 ppm
Temperature: room temperature
Measurement method: DD/MAS method, $^{29}$Si, 45°
Sample tube: zirconia, 8.0 mmø
Sample: the sample tube is filled with a powder of silica fine particle A
Sample spinning rate: 6 kHz
Relaxation delay: 90 s
Scans: 5640

The PD1 peak corresponding to silicon atoms having the D1 unit structure and the PD2 peak corresponding to silicon atoms having the D2 unit structure are obtained by carrying out peak separation of the peak corresponding to the siloxane chain that is observed in the vicinity of −20 ppm in the NMR spectrum yielded by measurement as described above; the peak areas SD1 and SD2 are determined from the respective peaks and the full width at half maximum WD2 is also determined. Peak separation is carried out using the procedure described in the following.

Peak Separation Method

Peak separation is carried out by analysis of the data in the NMR spectrum yielded by the method described above. Commercial software or an in-house program may be used in the execution of peak separation by the following procedure.

Peak separation processing is carried out using the Voigt function with the peak positions being established, respectively, at −18.2 ppm for the position of the PD1 peak and at −21.0 ppm for the position of the PD2 peak.

Method for Separating the Silica Fine Particle A from the Toner Particle 20 g of a 10 mass % aqueous solution of "Contaminon N" (neutral pH 7 detergent for cleaning precision measurement instrumentation, comprising a nonionic surfactant, anionic surfactant, and organic builder) is weighed into a vial with a 50 mL capacity and mixing with 1 g of the toner is carried out.

This is set in a "KM Shaker" (model: V.SX, Iwaki Sangyo Co., Ltd.) and shaking is carried out for 30 seconds with the speed set to 50. This results in the transfer of the silica fine particle A from the toner particle surface to the aqueous solution side. In the case of a magnetic toner containing a magnetic body, this is followed by separation of the silica fine particles that have transferred into the supernatant, with the toner particles being constrained using a neodymium magnet. The sedimented toner is dried and solidified using a vacuum dryer (40° C./24 hours) and the silica fine particles are obtained.

In the case of a nonmagnetic toner, a centrifugal separator (H-9R, Kokusan Co., Ltd.) (5 minutes at 1,000 rpm) is used to separate the toner particles from the silica fine particles transferred into the supernatant.

When an external additive besides the silica fine particle A has been externally added to the toner, the silica fine particle A can be separated from the other external additive by carrying out a centrifugal separation process on the external additives that have been separated from the toner using the method described above. Even when a plurality of silica fine particle species have been externally added to the toner, they can be separated using a centrifugal separation process as long as they have different particle diameter ranges. For example, separation can be performed using conditions of 40,000 rpm for 20 minutes using a CS120FNX from Hitachi Koki Co., Ltd.

The silica fine particle A is thought to contain the structure given by the Formula (4). In Formula (4), the leftmost silicon atom (Q unit structure) is silicon from the silica fine particle substrate, and the moiety (D1 unit structure, D2 unit structure) bonded thereto is a moiety (siloxane chain) derived from the surface treatment agent that is chemically bonded to the surface of the silica fine particle substrate. There are no limitations on the value of n in Formula (4), but, considering that (SD1+SD2)/SD1 is 1.2 to 3.8 and WD2 is 0.1 to 6.0 ppm, presumably n=1 or 2 forms the center of the distribution of the value of n and the distribution of the value of n falls into the range of approximately n=0 to 5.

(4)

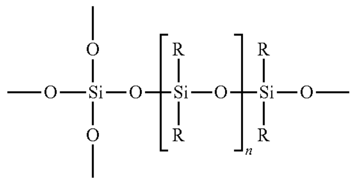

In the formula, each R independently represents a hydrogen atom, methyl group, or ethyl group, and n is an integer of 0 or more (preferably 0 to 5).

The silica fine particle A preferably comprises at a surface thereof a siloxane structure-bearing compound. In addition, this is preferably obtained by treating the surface of the silica fine particle substrate using a siloxane bond-containing surface treatment agent. That is, the silica fine particle A preferably is a treated material provided by treatment with a siloxane bond-containing surface treatment agent.

In the present disclosure, "silica fine particle A" includes the surface treatment agent-derived portions when the silica fine particle A has been surface-treated with a siloxane bond-containing surface treatment agent. A silica fine particle prior to surface treatment is also referred to as a "silica fine particle substrate".

The siloxane bond-containing surface treatment agent is not particularly limited and known materials may be used. Surface treatment of the silica fine particle substrate is preferably performed in order to facilitate obtaining the properties described in the preceding.

The siloxane bond-containing surface treatment agent can be exemplified by silicone oils, e.g., dimethylsilicone oil; by silicone oils provided by the modification of a dimethylsilicone oil with an organic group in side chain or terminal position, e.g., methylhydrogensilicone oil, methylphenylsilicone oil, alkyl-modified silicone oil, chloroalkyl-modified silicone oil, chlorophenyl-modified silicone oil, fatty acid-modified silicone oil, polyether-modified silicone oil, alkoxy-modified silicone oil, carbinol-modified silicone oil, amino-modified silicone oil, and fluorine-modified silicone oil; and by cyclic siloxanes, e.g., hexamethylcyclotrisiloxane, octamethylcyclotetrasiloxane, and decamethylcyclopentasiloxane.

The siloxane bond-containing surface treatment agent is preferably a cyclic siloxane. Cyclic siloxanes up to 10-membered rings are more preferred. The cyclic siloxane may be a cyclic siloxane in which a portion of the silicon atom-bonded methyl groups have a substituent. The cyclic siloxane is preferably at least one selection from the group consisting of hexamethylcyclotrisiloxane, octamethylcyclotetrasiloxane, and decamethylcyclopentasiloxane. The cyclic siloxane more preferably comprises octamethylcyclotetrasiloxane from the standpoints of ease of control of the chain length and ease of purification.

The method for performing surface treatment of the silica fine particle substrate is not particularly limited, and surface treatment can be performed by bringing the siloxane bond-containing surface treatment agent into contact with the silica fine particle substrate. Viewed from the standpoint of uniformly treating the surface of the silica fine particle substrate and readily achieving the properties described in the preceding, the surface treatment agent is preferably brought into contact with the silica fine particle substrate by a dry method. Examples, as described in the following, are a method in which a vapor of the surface treatment agent is brought into contact with the silica fine particle substrate, or a method in which contact with the silica fine particle substrate is effected by spraying an undiluted solution of the surface treatment agent or by spraying a dilution thereof with any of various solvents.

The treatment temperature is not particularly limited because it also varies as a function of, e.g., the reactivity of the surface treatment agent being used. A heat treatment at a temperature of 300° C. or more with mixing of the silica fine particle substrate and surface treatment agent is preferred. From 300° C. to 380° C. is more preferred.

The treatment time also varies as a function of the reactivity of the surface treatment agent being used and the treatment temperature, but is preferably from 5 minutes to 300 minutes, more preferably from 30 minutes to 240 minutes, and still more preferably from 60 minutes to 200 minutes. Having the treatment temperature and treatment time of the surface treatment be in the indicated ranges is also preferred from the standpoint of bringing about a satisfactory reaction of the treatment agent with the silica fine particle substrate and from the standpoint of production efficiency.

In a preferred method for contacting the surface treatment agent with the silica fine particle substrate, contact is performed with a vapor of the surface treatment agent under reduced pressure or in an inert gas atmosphere, for example, a nitrogen atmosphere. By using a method in which contact with a vapor is carried out, surface treatment agent that has not reacted with the silica fine particle surface is easily removed and control of the full width at half maximum (WD2) of the peak corresponding to the silicon atom having the D2 unit structure is facilitated. When the method of contact with a vapor of the surface treatment agent is used, the treatment preferably is performed at a treatment temperature equal to or greater than the boiling point of the surface treatment agent. Contact with the vapor may be performed divided into a plurality of times (for example, 2 or 3 times).

The silica fine particle A is more preferably provided by the treatment of a silica fine particle substrate with cyclic siloxane and in particular by carrying out the treatment at a treatment temperature of 300° C. or more.

Cyclic siloxane reacts by a ring-opening reaction with the SiOH group on the surface of the silica fine particle substrate, and as a consequence the D1 unit structure can be effectively obtained and control of the full width at half maximum (WD2) of the peak (PD2) corresponding to the silicon atom having the D2 unit structure is also facilitated.

On the other hand, a reaction site for additional cyclic siloxane is readily formed by a silicon atom having the terminal D1 unit structure that is produced accompanying ring opening, facilitating chain length elongation; however, both siloxane bond production and cleavage occur at a treatment temperature of 300° C. or more. As a result, the siloxane chains assume a state in which the chain length is short and uniformly matching, and the value of (SD1+SD2)/SD1×100 and the value of WD2 come to reside in the prescribed ranges.

The amount of the surface treatment agent, relative to 100 parts by mass of the silica fine particle substrate, is preferably from 40 parts by mass to 150 parts by mass and is more preferably from 70 parts by mass to 140 parts by mass. In particular, when the surface treatment is performed by a method in which contact with cyclic siloxane is effected using a vapor, preferably at least 70 parts by mass is added and more preferably at least 100 parts by mass is added, in each case relative to 100 parts by mass of the silica fine particle substrate. This enables a more uniform surface treatment of the silica fine particle substrate and as a consequence facilitates control of the full width at half maximum (WD2) of the peak (PD2) corresponding to the silicon atom having the D2 unit structure.

When the surface treatment is carried out under reduced pressure, the pressure within the vessel due to the vapor of the surface treatment agent is preferably brought to from 0.1 Pa to 100.0 Pa and more preferably from 1.0 Pa to 10.0 Pa. By having the pressure be in the indicated range, the frequency of contact between vapor molecules of the surface treatment agent is reduced and surface treatment agent-to-surface treatment agent chemical reactions are then suppressed, and chemical reactions between the silica fine particle substrate and the surface treatment agent in contact with the silica fine particle substrate surface can proceed preferentially.

In addition, secondary reaction products produced by chemical reactions between the silica fine particle substrate and the surface treatment agent are easily removed from the vicinity of the silica fine particle surface and contact by the surface treatment agent with the silica fine particle substrate surface is more easily achieved, and the surface of the silica fine particle substrate can then be more uniformly treated. This serves to facilitate control of the full width at half maximum (WD2) of the peak corresponding to the silicon atom having the D2 unit structure.

When the surface treatment is carried out under reduced pressure, contact between the surface treatment agent and the silica fine particle substrate surface is preferably preceded by the execution of a degassing treatment in which the silica fine particle substrate is heated under reduced pressure; this removes, for example, the moisture adsorbed to the surface of the silica fine particle substrate. By doing this, contact by the surface treatment agent with the silica fine particle substrate surface is more easily achieved and the surface of the silica fine particle substrate can then be more uniformly treated. Moreover, from the standpoint of further facilitating contact between the surface treatment agent and the silica fine particle substrate surface, the degassing treatment and the surface treatment of the silica fine particle by the surface treatment agent are also preferably carried out repeatedly.

The execution of such a method as described above enables the formation of siloxane chains at the silica fine particle surface so as to provide an (SD1+SD2)/SD1 of 1.2 to 3.8 and a WD2 of 0.1 ppm to 6.0 ppm.

In addition, as long as ranges that satisfy the stipulations of the present invention are observed, additional treatment using a siloxane bond-containing surface treatment agent as described above may be carried out after the silica fine particle A has been obtained by a method as described above. The method for carrying out this treatment is not particularly limited, and, for example, the silica fine particle can be brought into contact with a siloxane bond-containing surface treatment agent.

The hydrogen atom on the silanol groups of the silica fine particle substrate is replaced by the above-described siloxane chains in the silica fine particle A, which then has a high hydrophobicity. The hydrophobicity of a silica fine particle can be estimated by measuring the amount of moisture adsorption for the silica fine particle. An amount of moisture adsorption, per 1 $m^2$ of a BET specific surface area, for the silica fine particle A at a temperature of 30° C. and a relative humidity of 80% is preferably 0.010 $cm^3/m^2$ to 0.100 $cm^3/m^2$, more preferably 0.020 $cm^3/m^2$ to 0.070 $cm^3/m^2$, and still more preferably 0.030 $cm^3/m^2$ to 0.060 $cm^3/m^2$.

The toner production method preferably comprises a step of producing the silica fine particle A and a step of obtaining a toner by mixing a toner particle with the silica fine particle A. In addition, the toner production method preferably has a step of providing the silica fine particle A yielded by the following step.

The step of producing the silica fine particle A preferably comprises:

a step of mixing a silica fine particle substrate and a siloxane bond-containing surface treatment agent (preferably a cyclic siloxane) and carrying out a heat treatment at a temperature of 300° C. or more to carry out surface treatment of the surface of the silica fine particle substrate with the siloxane bond-containing surface treatment agent, and to produce the silica fine particle A.

The silica fine particle A can be exemplified by the fumed silicas produced by the combustion in an oxyhydrogen flame of a silicon compound, particularly a silicon halide, generally a silicon chloride, and commonly a purified silicon tetrachloride; wet silicas produced from water glass; sol-gel method silica particles obtained by a wet method; gel method silica particles; aqueous colloidal silica particles; alcoholic silica particles; fused silica particles obtained by a vapor phase method; and deflagration method silica particles. Fumed silicas are preferred.

The silica fine particle A is preferably, for example, a spherical silica fine particle. This "spherical" also encompasses nearly spherical such as slightly ellipsoidal shapes and shapes in which a portion has been slightly chipped. The average circularity of the silica fine particle A is preferably 0.900 to 1.000 and more preferably 0.930 to 0.990.

Measurement of the Average Circularity of Silica Fine Particle A

The silica fine particle A is imaged using a scanning electron microscope (SEM) at an image amplification of 25,000× using a pixel count of 1280×960 (size of one pixel=approximately 4 nm×approximately 4 nm), and the acquired image is analyzed using ImageJ image analysis software (can be acquired from https://imagej.nih.gov/ij/) to determine the circularity.

Contour extraction is first performed on the silica fine particle A and the projected area S and its peripheral length L are measured.

The circle-equivalent diameter and circularity are then determined using the area S and peripheral length L. The circle-equivalent diameter is the diameter of the circle that has the same area as the projected area of the particle image; the circularity is defined as the value yielded by dividing the peripheral length of the circle determined using the circle-equivalent diameter, by the peripheral length of the projected particle image, and is calculated using the following formula.

$$\text{circularity} = 2\times(\pi\times S)^{1/2}/L$$

This circularity is calculated for at least 100 of the silica fine particles A, and the arithmetic average thereof is used as the average circularity of the silica fine particle A.

Even more favorable effects are obtained for the toner according to the present invention by the use, in addition to the silica fine particle A, of a silica fine particle B that has been subjected to a surface treatment using silicone oil.

This is thought to be due to the following: due to the presence of silicone oil at the surface of the silica fine particle B, the charge produced at the silica fine particle A can suitably diffuse to the toner surface without localization. As a result, the charge status assumes an excellent uniformity, there is little fluctuation in image density even when the environment changes, and changes in the image density during continuous printing can be suppressed.

The silica fine particle B is preferably a material provided by treating a silica fine particle substrate with cyclic siloxane, as for the silica fine particle A, followed by treatment with silicone oil.

The method for carrying out the surface treatment with silicone oil is not particularly limited, but, for example, silicone oil may be brought into contact (also referred to in the following as the second stage surface treatment) with a silica fine particle that has been treated with cyclic siloxane.

The treatment temperature for the second stage surface treatment is not particularly limited, but is preferably 300° C. or more and is more preferably from 300° C. to 380° C. Observing this range facilitates a uniform intercompatibilization of the silicone oil with the surface of the cyclic siloxane-surface-treated silica fine particle.

From the standpoint of uniformly treating the silica fine particle surface, the treatment time in the second stage surface treatment is preferably from 30 minutes to 150 minutes and is more preferably from 60 minutes to 120 minutes.

The amount of silicone oil addition, relative to 100 mass parts of the silica fine particle substrate, is preferably from 3 parts by mass to 25 parts by mass and is more preferably from 5 parts by mass to 20 parts by mass. The use of this amount of addition makes it possible to achieve a uniform treatment of the surface of the silica fine particle.

From the standpoint of achieving a uniform treatment of the silica fine particle surface, the kinematic viscosity of the silicone oil at a temperature of 25° C. is preferably 30 to 500 $mm^2/s$ and is more preferably 30 to 200 $mm^2/s$.

A silica fine particle B provided by the surface treatment with silicone oil of the surface of a silica fine particle is favorably obtained using the treatment conditions as described in the preceding.

The presence of silicone oil at the silica fine particle B surface can be confirmed using the method described in the following.

Method for Extracting Silicone Oil from the Silica Fine Particle B and Method for Analysis Thereof The silicone oil eluted by immersing the silica fine particle B in normal-hexane is separated and confirmation that it is silicone oil is made by compositional analysis.

Specifically, 0.5 g of a silica fine particle B sample and 32 mL normal-hexane were placed in a 50-mL centrifuge tube and ultrasound dispersion/suspension was carried out for 30 minutes using an ultrasound cleaner (1510JMTH, Yamato Scientific Co., Ltd.). The resulting suspension was subjected to centrifugal separation and a liquid phase (silicone oil) was separated and recovered.

This separated and recovered material can be confirmed to be silicone oil by comparing the infrared absorption spectra acquired from the separated and recovered material and from silicone oil prepared as an authentic sample.

The amount of moisture adsorption, per 1 $m^2$ of a BET specific surface area, for the silica fine particle B at a temperature of 30° C. and a relative humidity of 80% is preferably 0.010 $cm^3/m^2$ to 0.100 $cm^3/m^2$, more preferably 0.010 $cm^3/m^2$ to 0.060 $cm^3/m^2$, and still more preferably 0.010 $cm^3/m^2$ to 0.040 $cm^3/m^2$.

As a consequence of this, the required quantity of charge can be rapidly generated, excessive localization of the generated charge can be avoided, and the charge can suitably diffuse into the surroundings. As a result, an excellent charge stability is provided, there is little fluctuation in image density even when the environment changes, and changes in the image density during continuous printing can be suppressed.

Method for Measuring the Amount of Moisture Adsorption

The amount of moisture adsorption by the silica fine particle is measured using an adsorption equilibration analyzer (BELSORP-aqua3, BEL JAPAN, Inc.). This instrument measures the amount of adsorption of a target gas (water vapor).

Degassing

The moisture adsorbed to the sample is degassed prior to the measurement. The cell, filler rod, and cap are assembled and weighed empty. 0.3 g of sample is weighed and introduced into the cell. The filler rod is inserted into the cell, the cap is attached, and attachment to the degassing port is carried out. The helium valve is opened once all the cells to be measured are attached to the degassing port. The button for a port to be degassed is set to ON and the "VAC" button is pressed. Degassing is performed for at least one day.

Measurement

The power to the main unit (there is a switch on the back side of the main unit) is turned ON. The vacuum pump is also started at the same time. The power to the water circulation unit and the operating panel is turned ON. "BELaqua3.exe" (measurement software) in the center of the PC screen is booted. Temperature control of the hot air bath: "SV" in the "TIC1" frame on the "Flow Diagram" window is double-clicked to open the "Temperature Setting" window. The temperature (80° C.) is entered and Set is clicked.

Adsorption temperature control: "SV" in "Adsorption Temperature" in the "Flow Diagram" window is double-clicked and the "SV value" (adsorption temperature) is entered. "Start Circulation" and "External Temperature Control" are clicked and Set is clicked.

The "PURGE" button is pressed and degassing is stopped, the port button is set to OFF, the sample is removed, cap 2 is attached, the sample is weighed, and the sample is attached to the main measurement unit. "Measurement Conditions" on the PC is clicked to open the "Measurement Conditions Setting" window. The measurement conditions are as follows.

air thermostat tank temperature: 80.0° C., adsorption temperature: 30.0° C., adsorbate name: $H_2O$, equilibration time: 500 sec, temperature hold: 60 min, saturated vapor pressure: 4.245 kPa, sample tube pumping speed: normal, chemical adsorption measurement: no, initial amount introduced: 0.20 $cm^3$ (STP)$\cdot g^{-1}$, number of measurement relative pressure ranges: 4.

The number of samples to be measured is selected and the "Measurement Data File Name" and "Sample Weight" are entered. The measurement is started.

Analysis

The analysis software is booted and analysis is performed and the amount of moisture adsorption per unit mass ($cm^3/g$) at a relative vapor pressure of 80% is calculated. The amount of moisture adsorption per surface area ($cm^3/m^2$) is then determined by dividing the calculated amount of moisture adsorption per unit mass by the BET specific surface area of the silica fine particle yielded by the method described below.

Measurement of the BET Specific Surface Area of the Silica Particle

The BET specific surface area of the silica fine particle can be determined according to the BET method (the BET multipoint method) using a cryogenic gas adsorption procedure based on a dynamic constant pressure procedure. Using a specific surface area analyzer (product name: Gemini 2375 Ver. 5.0, Shimadzu Corporation), the BET specific surface area ($m^2/g$) can be calculated by measurement carried out using the BET multipoint method and adsorption of nitrogen gas to the sample surface.

Known materials can be used for the silica fine particle substrate, which is a silica fine particle prior to surface treatment. Examples in this regard are the fumed silicas produced by the combustion in an oxyhydrogen flame of a silicon compound, particularly a silicon halide, generally a silicon chloride, and commonly a purified silicon tetrachloride; wet silicas produced from water glass; sol-gel method silica particles obtained by a wet method; gel method silica particles; aqueous colloidal silica particles; alcoholic silica particles; fused silica particles obtained by a vapor phase method; and deflagration method silica particles. Fumed silicas are preferred.

The number-average primary particle diameter of the silica fine particle A is preferably 5 to 500 nm, more preferably 8 to 310 nm, still more preferably 50 to 300 nm, and particularly preferably 50 to 200 nm. This enables a suitable coverage of the toner particle by the silica fine particle A. As a result, due to an optimization of the contact area between the silica particle and the toner particle, the charge generated at the silica fine particle A surface can suitably diffuse into the surroundings without localization and as a consequence an excellent charge stability is provided.

The number-average primary particle diameter of the silica fine particle B is preferably 5 to 25 nm and more preferably 5 to 17 nm. In addition, the number-average primary particle diameter of the silica fine particle B is preferably at least 50 nm smaller, more preferably at least 70 nm smaller, and still more preferably at least 100 nm smaller than the number-average primary particle diameter of the silica fine particle A. For example, the number-average particle diameter of the silica fine particle B is preferably 50 to 200 nm smaller, more preferably 70 to 180 nm smaller, and still more preferably 100 to 150 nm smaller than the number-average particle diameter of the silica fine particle A.

When the number-average primary particle diameters of the silica fine particle A and the silica fine particle B reside in the aforementioned relationship, charge generated by the triboelectric charging of the silica fine particle A can suitably diffuse to the toner surface without the silica fine particle B causing localization. As a result, an excellent uniformity is provided for the charge status, there is little fluctuation in image density even in the case of changes in the environment, and changes in the image density during continuous printing can be suppressed.

The number-average primary particle diameters of silica fine particles A and B can be adjusted by controlling the conditions in, e.g., the reaction step, pulverization step, classification step, and so forth, in the silica fine particle production process.

Number-Average Particle Diameter of the Silica Fine Particle

The number-average particle diameter of the silica fine particle can be measured in the range setting of 0.001 μm to 10 μm using an HRA (X-100) Microtrac particle size distribution analyzer (Nikkiso Co., Ltd.).

The determination can also be made by measuring the number and particle diameter (largest diameter) of the silica fine particles present on the toner particle surface during observation of the toner particle using a scanning electron microscope (SEM), whereby a number-average particle diameter that is substantially the same is obtained. Here, an energy-dispersive x-ray analyzer (EDS) attached to the SEM can be used to confirm that the material targeted for measurement is a silica fine particle. When a silica fine particle A+silica fine particle B combination is used, due to the co-use of silica fine particles that exhibit large differences in the particle diameter, as a general matter the average particle diameter can be calculated by establishing a prescribed particle diameter as a dividing line and partitioning into particles larger than this and particles smaller than this. For the dividing line particle diameter, the particle diameter distribution of the silica fine particles on the toner particle surface may be measured and a particle diameter whose frequency is a trough (minimum value sandwiched between maximum values) may be used.

The toner production method preferably comprises a step of producing the silica fine particle B. In addition, the toner production method preferably comprises a step of providing the silica fine particle B yielded by the following step.

The step of producing the silica fine particle B preferably comprises:

a step of mixing a silica fine particle substrate and a siloxane bond-containing surface treatment agent and carrying out a heat treatment at a temperature of 300° C. or more, to obtain a surface-treated material from the silica fine particle substrate by the action of the siloxane bond-containing surface treatment agent; and a step of preparing the silica fine particle B by additionally subjecting the silica fine particle substrate in the surface-treated material to surface treatment with silicone oil.

The silica fine particle B can be exemplified by the fumed silicas produced by the combustion in an oxyhydrogen flame of a silicon compound, particularly a silicon halide, generally a silicon chloride, and commonly a purified silicon tetrachloride; wet silicas produced from water glass; sol-gel method silica particles obtained by a wet method; gel method silica particles; aqueous colloidal silica particles; alcoholic silica particles; fused silica particles obtained by a vapor phase method; and deflagration method silica particles. Fumed silicas are preferred.

The toner particle may contain a binder resin. A known binder resin can be used in the toner particle. The following are examples of the binder resin:

styrene resins, styrenic copolymer resins, polyester resins, polyol resins, polyvinyl chloride resins, phenolic resins, natural resin-modified phenolic resins, natural resin-modified maleic acid resins, acrylic resins, methacrylic resins, polyvinyl acetate, silicone resins, polyurethane resins, polyamide resins, furan resins, epoxy resins, xylene resins, polyvinyl butyral, terpene resins, coumarone-indene resins, and petroleum resins. Resins preferred for use are styrenic copolymer resins, polyester resins, and hybrid resins provided by mixing a polyester resin with a styrenic copolymer resin or partially reacting the two. The use of polyester resins is preferred.

The components constituting the polyester resin will now be described. A single species or two or more species of the various following components can be used depending on the type and use.

The dibasic carboxylic acid component constituting the polyester resin can be exemplified by the following dicarboxylic acids and their derivatives: benzenedicarboxylic acids and their anhydrides and lower alkyl esters, e.g., phthalic acid, terephthalic acid, isophthalic acid, and phthalic anhydride; alkyl dicarboxylic acids, e.g., succinic acid, adipic acid, sebacic acid, and azelaic acid, and their anhydrides and lower alkyl esters; alkenylsuccinic acids and alkylsuccinic acids having an average value for the number of carbons of from 1 to 50, and their anhydrides and lower alkyl esters; and unsaturated dicarboxylic acids, e.g., fumaric acid, maleic acid, citraconic acid, and itaconic acid, and their anhydrides and lower alkyl esters.

The alkyl group in the lower alkyl esters can be exemplified by the methyl group, ethyl group, propyl group, and isopropyl group.

The dihydric alcohol component constituting the polyester resin, on the other hand, can be exemplified by the following:

ethylene glycol, polyethylene glycol, 1,2-propanediol, 1,3-propanediol, 1,3-butanediol, 1,4-butanediol, 2,3-butanediol, diethylene glycol, triethylene glycol, 1,5-pentanediol, 1,6-hexanediol, neopentyl glycol, 2-methyl-1,3-propanediol, 2-ethyl-1,3-hexanediol, 1,4-cyclohexanedimethanol (CHDM), hydrogenated bisphenol A, bisphenols given by Formula (I-1) and derivatives thereof, and diols given by Formula (I-2).

(I-1)

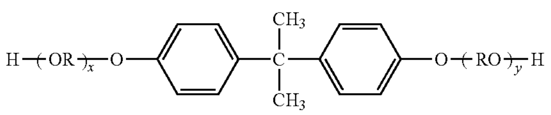

In Formula (I-1), R is the ethylene group or propylene group, x and y are each integers equal to or greater than 0, and the average value of x+y is from 0 to 10.

(I-2)

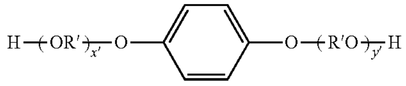

In Formula (I-2), R' is the ethylene group or propylene group, x' and y' are each integers equal to or greater than 0, and the average value of x'+y' is from 0 to 10.

In addition to the aforementioned dibasic carboxylic acid component and dihydric alcohol component, the constituent components of the polyester resin may also contain an at least tribasic carboxylic acid component and an at least trihydric alcohol component.

The at least tribasic carboxylic acid component is not particularly limited and can be exemplified by trimellitic acid, trimellitic anhydride, and pyromellitic acid. The at least trihydric alcohol component can be exemplified by trimethylolpropane, pentaerythritol, and glycerol.

In addition to the aforementioned compounds, the constituent components of the polyester resin may include a monobasic carboxylic acid component and a monohydric alcohol component as constituent components. Specifically, the monobasic carboxylic acid component can be exemplified by palmitic acid, stearic acid, arachidic acid, behenic acid, cerotic acid, heptacosanoic acid, montanic acid, melissic acid, lacceric acid, tetracontanoic acid, and pentacontanoic acid.

The monohydric alcohol component can be exemplified by behenyl alcohol, ceryl alcohol, melissyl alcohol, and tetracontanol.

The toner may be used in the form of a magnetic single-component toner, a nonmagnetic single-component toner, or a nonmagnetic two-component toner.

When used in the form of a magnetic single-component toner, a magnetic iron oxide particle is preferably used as a colorant. The magnetic iron oxide particle contained in a magnetic single-component toner can be exemplified by magnetic iron oxides such as magnetite, maghemite, and ferrite, and by magnetic iron oxides that contain other metal oxides; as well as by metals such as Fe, Co, and Ni, alloys of these metals with metals such as Al, Co, Cu, Pb, Mg, Ni, Sn, Zn, Sb, Be, Bi, Cd, Ca, Mn, Se, Ti, W, and V, and their mixtures. The content of the magnetic iron oxide particle is preferably from 30 parts by mass to 150 parts by mass relative to 100 parts by mass of the binder resin.

Examples of the colorant are provided below for the case of use in the form of a nonmagnetic single-component toner or a nonmagnetic two-component toner.

Carbon black, e.g., furnace black, channel black, acetylene black, thermal black, and lamp black, may be used as a black pigment, as can a magnetic powder such as magnetite and ferrite.

A pigment or dye may be used as a colorant suitable for the color yellow. The pigments can be exemplified by C. I. Pigment Yellow 1, 2, 3, 4, 5, 6, 7, 10, 11, 12, 13, 14, 15, 17, 23, 62, 65, 73, 74, 81, 83, 93, 94, 95, 97, 98, 109, 110, 111, 117, 120, 127, 128, 129, 137, 138, 139, 147, 151, 154, 155, 167, 168, 173, 174, 176, 180, 181, 183, and 191, and C. I. Vat Yellow 1, 3, and 20. The dyes can be exemplified by C. I. Solvent Yellow 19, 44, 77, 79, 81, 82, 93, 98, 103, 104, 112, and 162. A single one of these may be used by itself or two or more may be used in combination.

A pigment or dye may be used as a colorant suitable for the color cyan. The pigments can be exemplified by C. I. Pigment Blue 1, 7, 15, 15:1, 15:2, 15:3, 15:4, 16, 17, 60, 62, and 66; C. I. Vat Blue 6; and C. I. Acid Blue 45. The dyes can be exemplified by C. I. Solvent Blue 25, 36, 60, 70, 93, and 95. A single one of these may be used by itself or two or more may be used in combination.

A pigment or dye may be used as a colorant suitable for the color magenta. The pigments can be exemplified by C. I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 48, 48:2, 48:3, 48:4, 49, 50, 51, 52, 53, 54, 55, 57, 57:1, 58, 60, 63, 64, 68, 81, 81:1, 83, 87, 88, 89, 90, 112, 114, 122, 123, 144, 146, 150, 163, 166, 169, 177, 184, 185, 202, 206, 207, 209, 220, 221, 238, and 254; C. I. Pigment Violet 19; and C. I. Vat Red 1, 2, 10, 13, 15, 23, 29, and 35.

The magenta dyes can be exemplified by oil-soluble dyes such as C. I. Solvent Red 1, 3, 8, 23, 24, 25, 27, 30, 49, 52, 58, 63, 81, 82, 83, 84, 100, 109, 111, 121, and 122, C. I. Disperse Red 9, C. I. Solvent Violet 8, 13, 14, 21, and 27, and C. I. Disperse Violet 1, and by basic dyes such as C. I. Basic Red 1, 2, 9, 12, 13, 14, 15, 17, 18, 22, 23, 24, 27, 29, 32, 34, 35, 36, 37, 38, 39, and 40, and C. I. Basic Violet 1, 3, 7, 10, 14, 15, 21, 25, 26, 27, and 28. A single one of these may be used by itself or two or more may be used in combination.

The colorant content is preferably from 1 parts by mass to 20 parts by mass relative to 100 parts by mass of the binder resin.

A release agent (wax) may be used in order to provide the toner with releasability.

The wax can be exemplified by the following: aliphatic hydrocarbon waxes such as low molecular weight polyethylene, low molecular weight polypropylene, olefin copolymers, microcrystalline wax, paraffin wax, and Fischer-Tropsch waxes; oxidized waxes of aliphatic hydrocarbon waxes, such as oxidized polyethylene wax; waxes in which the major component is fatty acid ester, such as carnauba wax, behenyl behenate, and montanic acid ester wax; and waxes provided by the partial or complete deoxidization of fatty acid esters such as deoxidized carnauba wax.

Additional examples are as follows: saturated straight-chain fatty acids such as palmitic acid, stearic acid, and montanic acid; unsaturated fatty acids such as brassidic acid, eleostearic acid, and valinaric acid; saturated alcohols such as stearyl alcohol, aralkyl alcohols, behenyl alcohol, carnaubyl alcohol, ceryl alcohol, and melissyl alcohol; polyhydric alcohols such as sorbitol; fatty acid amides such as linoleamide, oleamide, and lauramide; saturated fatty acid bisamides such as methylenebisstearamide, ethylenebiscapramide, ethylenebislauramide, and hexamethylenebisstearamide; unsaturated fatty acid amides such as ethylenebisoleamide, hexamethylenebisoleamide, N,N'-dioleyladipamide, and N,N'-dioleylsebacamide; aromatic bisamides such as m-xylenebisstearamide and N,N'-distearylisophthalamide; fatty acid metal salts (generally known as metal soaps) such as calcium stearate, calcium laurate, zinc stearate, and magnesium stearate; waxes provided by grafting an aliphatic hydrocarbon wax using a vinyl comonomer such as styrene or acrylic acid; partial esters between a fatty acid and a polyhydric alcohol, such as behenyl monoglyceride; and hydroxy group-containing methyl ester compounds obtained by, e.g., the hydrogenation of plant oils.

Aliphatic hydrocarbon waxes are waxes particularly preferred for use. Preferred examples are low molecular weight hydrocarbons provided by the high-pressure radical polymerization of alkylene or by the low-pressure polymerization of alkylene in the presence of a Ziegler catalyst or metallocene catalyst; Fischer-Tropsch waxes synthesized from coal or natural gas; paraffin waxes; olefin polymers obtained by the pyrolysis of high molecular weight olefin polymers; and synthetic hydrocarbon waxes obtained from the distillation residue of hydrocarbon obtained by the Arge method from synthesis gas containing carbon monoxide and hydrogen, as well as the synthetic hydrocarbon waxes provided by the hydrogenation of such synthetic hydrocarbon waxes.

The use is more preferred of waxes obtained by subjecting a hydrocarbon wax to fractionation by a press sweating method, solvent method, use of vacuum distillation, or fractional crystallization. Among the paraffin waxes, Fischer-Tropsch waxes and n-paraffin waxes in which the straight-chain component predominates are particularly preferred from the standpoint of the molecular weight distribution.

A single one of these waxes may be used by itself or two or more may be used in combination. The wax is preferably added at from 1 parts by mass to 20 parts by mass relative to 100 parts by mass of the binder resin.

A charge control agent may be used in the toner. Known charge control agents may be used as this charge control agent. Examples here are azo iron compounds, azo chromium compounds, azo manganese compounds, azo cobalt compounds, azo zirconium compounds, chromium compounds of carboxylic acid derivatives, zinc compounds of carboxylic acid derivatives, aluminum compounds of carboxylic acid derivatives, and zirconium compounds of carboxylic acid derivatives.

Aromatic hydroxycarboxylic acids are preferred for the aforementioned carboxylic acid derivative. A charge control resin may also be used. As necessary, a single species of charge control agent may be used or two or more species of charge control agents may be used in combination. The charge control agent is preferably used at from 0.1 parts by mass to 10 parts by mass relative to 100 parts by mass of the binder resin.

The toner may be used in the form of a two-component developer in mixture with a magnetic carrier. An ordinary magnetic carrier, e.g., of ferrite, magnetite, and so forth, or a resin-coated carrier may be used as the magnetic carrier. Also usable are dispersed magnetic body-type resin particles comprising a magnetic powder dispersed in a resin component, or porous magnetic core particles containing a resin in the voids.

The following, for example, can be used for the magnetic body component used in dispersed magnetic body-type resin particles: magnetite particle powder, maghemite particle powder, and magnetic iron oxide particle powder provided by the incorporation in the preceding of at least one selection from the oxides of silicon, the hydroxides of silicon, the oxides of aluminum, and the hydroxides of aluminum; magnetoplumbite-type ferrite particle powder that contains barium, strontium, or barium-strontium; and various magnetic iron compound particle powders, e.g., spinel-type ferrite particle powders that contain at least one selection from manganese, nickel, zinc, lithium, and magnesium.

Other than the magnetic body component, a magnetic iron compound particle powder may be used in combination with a nonmagnetic iron oxide particle powder such as hematite particle powder, a nonmagnetic hydrous ferric oxide particle powder, or a nonmagnetic inorganic compound particle powder such as titanium oxide particle powder, silica particle powder, talc particle powder, alumina particle powder, barium sulfate particle powder, barium carbonate particle powder, cadmium yellow particle powder, calcium carbonate particle powder, and zinc white particle powder.

Magnetite and ferrite are examples of the material of the porous magnetic core particle. A specific example of ferrite is given by the following general formula.

$$(M1_2O)_x(M2O)_y(Fe_2O_3)_z$$

In this formula: M1 is a monovalent metal and M2 is a divalent metal, and x and y are each $0 \leq (x, y) \leq 0.8$ and z is $0.2 < z < 1.0$, where $x+y+z=1.0$.

The use of at least one metal atom selected from the group consisting of Li, Fe, Mn, Mg, Sr, Cu, Zn, and Ca as the M1 and M2 in the formula is preferred. Besides these, e.g., Ni, Co, Ba, Y, V, Bi, In, Ta, Zr, B, Mo, Na, Sn, Ti, Cr, Al, Si, and rare earths may also be used.

The magnetic carrier preferably comprises, for the resin-coated carrier, a magnetic carrier core particle and a resin-coating layer on the surface of the magnetic carrier core particle. The resin-coating layer, for example, coats the surface of the magnetic carrier core particle. The magnetic carrier core particle preferably is a porous magnetic core particle containing a resin in the voids.

A thermoplastic resin or a thermosetting resin may be used as the resin filled in the voids of the porous magnetic core particle.

Thermoplastic resins for use as this fill resin can be exemplified by novolac resins, saturated polyester resins, polyarylates, polyamide resins, and acrylic resins.

The thermosetting resins can be exemplified by phenolic resins, epoxy resins, unsaturated polyester resins, and silicone resins.

The method for coating the magnetic carrier core particle surface with the resin is not particularly limited, and examples are methods that carry out coating by a coating method such as an immersion method, a spray method, a brush coating method, or a fluidized bed. Immersion methods are preferred among these.

In order to control toner chargeability, the amount of resin coating the magnetic carrier core particle surface (i.e., the amount of the resin-coating layer) is preferably from 0.1 parts by mass to 5.0 parts by mass relative to 100 parts by mass of the magnetic carrier core particle.

The resin used for the resin-coating layer can be exemplified by acrylic resins, e.g., acrylate ester copolymers and methacrylate ester copolymers; styrene-acrylic resins, e.g., styrene-acrylate ester copolymers and styrene-methacrylate ester copolymers; fluorine-containing resins, e.g., polytetrafluoroethylene, tetrafluoroethylene hexafluoropropylene copolymers, monochlorotrifluoroethylene polymers, and polyvinylidene fluoride; as well as silicone resins, polyester resins, polyamide resins, polyvinyl butyral, aminoacrylate resins, ionomer resins, and polyphenylene sulfide resins.

A single of these resins may be used or a plurality may be used in combination. Acrylic resins are preferred.

Among the preceding, copolymers containing a (meth) acrylate ester having an alicyclic hydrocarbon group are particularly preferred from the standpoint of charge stability. The resin for the resin-coating layer preferably has a monomer unit provided by a (meth)acrylate ester having an alicyclic hydrocarbon group. That is, the resin of the resin-coating layer contains a polymer of monomer comprising at least a (meth)acrylate ester having an alicyclic hydrocarbon group.

Preferred examples of (meth)acrylate ester having an alicyclic hydrocarbon group are, e.g., cyclobutyl acrylate, cyclopentyl acrylate, cyclohexyl acrylate, cycloheptyl acrylate, dicyclopentenyl acrylate, dicyclopentanyl acrylate, cyclobutyl methacrylate, cyclopentyl methacrylate, cyclohexyl methacrylate, cycloheptyl methacrylate, dicyclopentenyl methacrylate, and dicyclopentanyl methacrylate.

The alicyclic hydrocarbon group is preferably a cycloalkyl group, with the number of carbons being preferably 3 to 10 and more preferably 4 to 8. One of these or a selection of two or more of these may be used.

The proportion, in the copolymer used in the resin-coating layer, of the monomer unit provided by (meth)acrylate ester having an alicyclic hydrocarbon group (i.e., the copolymerization proportion on a mass basis of the (meth)acrylate ester) is preferably from 5.0 mass % to 80.0 mass %, more preferably from 50.0 mass % to 80.0 mass %, and still more preferably from 70.0 mass % to 80.0 mass %. An excellent charging performance in high-temperature, high-humidity environments is provided when the indicated range is observed.

Moreover, from the standpoints of charge stability, increasing the adherence between the magnetic carrier core particle and the resin-coating layer, and suppressing, e.g., localized exfoliation of the resin-coating layer, the resin in the resin-coating layer more preferably contains a macromonomer as a copolymerization component. An example of a specific macromonomer is given by Formula (B). That is, the resin in the resin-coating layer preferably has a monomer unit provided by macromonomer given by Formula (B).

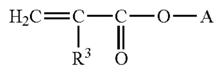

(B)

In Formula (B), A represents a polymer of at least one compound selected from the group consisting of methyl acrylate, methyl methacrylate, butyl acrylate, butyl methacrylate, 2-ethylhexyl acrylate, 2-ethylhexyl methacrylate, styrene, acrylonitrile, and methacrylonitrile. $R^3$ is H or $CH_3$.

The A is preferably a polymer of methyl methacrylate.

In order to improve the adherence between the magnetic carrier core particle and the resin-coating layer, the weight-average molecular weight of the macromonomer is preferably 3,000 to 10,000 and is more preferably 4,000 to 7,000.

In order to improve the adherence between the magnetic carrier core particle and the resin-coating layer, the proportion of the macromonomer-derived monomer unit in the resin used in the resin-coating layer is preferably from 0.5 mass % to 30.0 mass %, more preferably from 10.0 mass % to 30.0 mass %, and still more preferably from 20.0 mass % to 25.0 mass %.

Measurement of the Weight-Average Molecular Weight of the Macromonomer

The weight-average molecular weight is measured using gel permeation chromatography (GPC) and using the following procedure.

The measurement sample is first prepared as follows.

A sample (the coating resin is separated from the magnetic carrier and is fractionated with a fractionator to give the sample) is mixed at a concentration of 5 mg/mL with tetrahydrofuran (THF), and the sample is dissolved in the THF by standing for 24 hours at room temperature. This is followed by filtration across a sample treatment filter (Sample Pretreatment Cartridge H-25-2, Tosoh Corporation) to provide the GPC sample.

The measurement is then run using a GPC measurement instrument (HLC-8120GPC, Tosoh Corporation) in accordance with the operating manual provided with the instrument and using the following measurement conditions.

Measurement Conditions

Instrument: "HLC8120 GPC" high-performance GPC (Tosoh Corporation)

Column: 7-column train of Shodex KF-801, 802, 803, 804, 805, 806, and 807 (Showa Denko Kabushiki Kaisha)

Eluent: THF

Flow rate: 1.0 mL/min

Oven temperature: 40.0° C.

Amount of sample injection: 0.10 mL

For the calibration curve, a molecular weight calibration curve constructed using polystyrene resin standards (Tosoh Corporation, TSK Standard Polystyrene F-850, F-450, F-288, F-128, F-80, F-40, F-20, F-10, F-4, F-2, F-1, A-5000, A-2500, A-1000, A-500) is used to determine the weight-average molecular weight of the sample.

The toner comprises the toner particle and the silica fine particle A on the surface of the toner particle. The toner can be obtained by external addition of the silica fine particle A as an external additive to the toner particle. The content of the silica fine particle A in the toner, relative to 100 parts by mass of the toner particle, is preferably 0.01 to 10.00 parts by mass, more preferably 3.00 to 8.00 parts by mass, and still more preferably 3.40 to 6.00 parts by mass.

As a result of this, the silica fine particle A can more thoroughly coat the toner particle and an excellent charge stability is provided, there will be little fluctuation in the image density even in the event of changes in the environment, and changes in the image density during continuous printing can be suppressed.

The toner preferably additionally comprises the silica fine particle B at the surface of the toner particle. The toner can be obtained by external addition to the toner particle of the silica fine particle A and the silica fine particle B as external additives. The content of the silica fine particle B in the toner, relative to 100 parts by mass of the toner particle, is preferably 0.01 to 5.00 parts by mass, more preferably 0.10 to 3.00 parts by mass, and still more preferably 0.40 to 2.00 parts by mass.

External addition of external additive, e.g., the silica fine particle A and the silica fine particle B, to the toner particle can be carried out by mixing the toner particle with the external additive using a mixer as described in the following.

The mixer can be exemplified by the following: Henschel mixer (Mitsui Mining Co., Ltd.); Supermixer (Kawata Mfg. Co., Ltd.); Ribocone (Okawara Corporation); Nauta mixer, Turbulizer, and Cyclomix (Hosokawa Micron Corporation); Spiral Pin Mixer (Pacific Machinery & Engineering Co., Ltd.); and Loedige Mixer (Matsubo Corporation).

A portion of the silica fine particle A is preferably embedded in the toner particle surface. For silica fine particle A that is embedded in the toner particle surface, the embedding ratio of the silica fine particle A in the toner particle is preferably 5 to 50%, more preferably 5 to 40%, still more preferably 10 to 30%, particularly preferably 12 to 25%, and especially preferably 14 to 20%.

When the surface-treated silica fine particle A has a silica fine particle A embedding ratio in the aforementioned range, a strong chemical interaction appears between the toner particle and the polar O—R group residing in terminal position on the siloxane chains at the silica fine particle A surface. This serves to impede detachment of the silica fine particle A from the toner particle even when the toner particle undergoes impact.

In addition, by having the silica fine particle A embedding ratio be in the indicated range, the contact area between the silica fine particle A and toner particle and the exposed surface area of the silica fine particle A are favorably adjusted and a suitable balance is assumed between the ease of charge generation and ease of movement. As a result, it becomes possible to maintain the charge stability at a high level and changes in image density during continuous printing can be suppressed.

Calculation of the Silica Fine Particle A Embedding Ratio in the Toner Particle Surface First, in a pretreatment, silica fine particles that are not embedded or that have a small embedding ratio are separated from the toner. 20 g of a 10 mass % aqueous solution of "Contaminon N" (neutral pH 7 detergent for cleaning precision measurement instrumentation, comprising a nonionic surfactant, anionic surfactant, and organic builder) is weighed into a vial with a 50 mL capacity and mixing with 1 g of the toner is carried out.

This is set in a "KM Shaker" (model: V.SX) from Iwaki Sangyo Co., Ltd., and shaking is carried out for 30 seconds with the speed set to 50. This serves to transfer the non-embedded silica fine particles from the toner particle surface to the aqueous solution side.

In the case of a magnetic body-containing magnetic toner, this is followed by separation of the silica fine particles that have transferred into the supernatant while restraining the toner particles using a neodymium magnet, and the sedimented toner particles are dried and solidified by vacuum drying (40° C./24 hours) to provide the sample.

In the case of a nonmagnetic toner, a centrifugal separator (H-9R, Kokusan Co., Ltd.) (5 minutes at 1,000 rpm) is used to separate the toner particles from the unembedded silica fine particles that have transferred into the supernatant. A toner particle powder is collected by suction filtration of the residual toner particle and this toner particle powder is dried.

The toner particles are fixed using carbon tape to the sample platform of an electron microscope, and observation of the toner particles is carried out using the conditions given below. A location is selected where the angle of inclination of the toner particle surface is large (for example, 700 to 110°, preferably approximately 90°), and an image is acquired.

Instrument used: SU8220 from Hitachi High-Technologies Corporation

Acceleration voltage: 2 kV

Emission current: 10 μA

Image acquisition: secondary electron detector

Image amplification: 50,000×

Pixel count: 1280×960 (size of one pixel=approximately 2 nm×approximately 2 nm)

The acquired image is analyzed using ImageJ image analysis software (available at https://imagej.nih.gov/ij/). As shown in FIG. 1, a silica fine particle A is fitted to a true circle (a true circle is created using [Oval selections] (the shape is fixed as a true circle when the shift key is pressed during operation)), and the embedding ratio is calculated using the following formula and using the diameter a of the silica fine particle A and the length b of the embedded portion of the silica fine particle A. For the silica fine particle A fitted to a true circle, the length b is measured on the straight line that passes through the center of the silica fine particle A and the top in the depth direction on the embedded side.

embedding ratio (%)=length $b$ of embedded portion of silica fine particle $A$/diameter $a$ of silica fine particle $A$ This embedding ratio is calculated for at least 100 of the silica fine particles A, and the arithmetic average thereof is used as the embedding ratio of the silica fine particle A.

The silica fine particles A and the silica fine particles B on the toner surface can be distinguished from each other using the particle diameter.

The embedding ratio for the silica fine particle A can be controlled, for example, by adjusting the temperature when the toner particle is mixed with the silica fine particle A using a mixer such as described above. Or, the toner particle may be subjected to a surface treatment (silica fine particle A embedding treatment) after the toner particle has been mixed with the silica fine particle A, and the embedding ratio for the silica fine particle A may be controlled by adjusting the conditions in this surface treatment (temperature of the treatment atmosphere, exhaust air volume from the treatment space). A heat treatment is preferred for the surface treatment. A treatment method using a hot air current is an example.

Surface treatment of the toner particle can be carried out using devices such as the following: Hybridization System (Nara Machinery Co., Ltd.), Nobilta (Hosokawa Micron Corporation), Mechanofusion System (Hosokawa Micron Corporation), Faculty (Hosokawa Micron Corporation), Inomizer (Hosokawa Micron Corporation), Theta Composer (Tokuju Corporation), Mechanomill (Okada Seiko Co., Ltd.), and Meteo Rainbow MR Type (Nippon Pneumatic Mfg. Co., Ltd.).

When the silica fine particle A is used in combination with the silica fine particle B, preferably the external addition of the silica fine particle B is performed after the silica fine particle A embedding treatment step has been carried out using a method as described above. In addition, the silica fine particle A embedding treatment step may be followed by an additional external addition of the silica fine particle A or by the simultaneous external addition of silica fine particle A and silica fine particle B.

Thus, the toner production method preferably has:

- a step of obtaining a toner particle;
- a step of providing a silica fine particle A and a silica fine particle B;
- a step of externally adding the silica fine particle A to the obtained toner particle by mixing therewith;
- a step of carrying out a heat treatment on the toner particle to which the silica fine particle A has been externally added by mixing; and
- a step of externally adding the silica fine particle B to the heat-treated toner particle by mixing therewith.

In addition, the step of externally adding the silica fine particle B to the heat-treated toner particle by mixing therewith, preferably is a step of externally adding the silica fine particle A and the silica fine particle B to the heat-treated toner particle by mixing therewith.

A specific example is provided in the following of a method for carrying out the surface treatment of a toner particle (for example, a toner particle to which silica fine particle A has been externally added by mixing) using a hot air current and the heat treatment apparatus depicted in FIG. 2. In this example, the toner particle is referred to as the "material to be treated".

The material to be treated is metered and fed by a starting material metering and feed means 1 and is conducted, by a compressed gas adjusted by a compressed gas flow rate adjustment means 2, to an introduction tube 3 that is disposed on the vertical line of a starting material feed means. The material to be treated that has passed through the introduction tube 3 is uniformly dispersed by a conical projection member 4 that is disposed at the center of the starting material feed means, and is introduced into an 8-direction feed tube 5 that extends radially and is introduced into a treatment compartment 6 in which the heat treatment is performed.

At this point, the flow of the material to be treated fed into the treatment compartment 6 is regulated by a regulation means 9 that is disposed within the treatment compartment 6 in order to regulate the flow of the material to be treated. As a result, the material to be treated that has been fed into the treatment compartment 6 is heat treated while rotating within the treatment compartment 6 and is thereafter cooled.

The hot air current for carrying out the heat treatment of the introduced material to be treated is itself fed from a hot air current feed means 7 and is distributed by a distribution member 12, and the hot air current is introduced into the treatment compartment 6 having been caused to undergo a spiral rotation by a rotation member 13 for imparting rotation to the hot air current. With regard to its structure, the rotation member 13 for imparting rotation to the hot air current has a plurality of blades, and the rotation of the hot air current can be controlled using their number and angle (11 shows a hot air current feed means outlet).

The hot air current fed into the treatment compartment 6 has a temperature at the outlet of the hot air current feed means 7 of preferably from 100° C. to 300° C. and more preferably from 130° C. to 190° C. When the temperature at the outlet of the hot air current feed means 7 resides in the indicated range, the embedding ratio of the silica fine particle A can be brought into the preferred range while the melt adhesion and coalescence that would be induced by an excessive heating of the material to be treated can be prevented. The hot air current is fed from the hot air current feed means 7.

In addition, the heat-treated resin particles that have been heat treated are cooled by a cold air current fed from a cold air current feed means 8. The temperature of the cold air current fed from the cold air current feed means 8 is preferably from −20° C. to 30° C. When the cold air current temperature resides in this range, it is thought that the heat-treated material to be treated can be efficiently cooled and melt adhesion and coalescence of the material to be treated can be impeded. The absolute amount of moisture in the cold air current is preferably from 0.5 $g/m^3$ to 15.0 $g/m^3$.

The cooled material to be treated is then recovered by a recovery means 10 residing at the lower end of the treatment compartment 6. A blower (not shown) is disposed at the end of the recovery means 10 and thereby forms a structure that carries out suction transport.

In addition, a powder particle feed port 14 is disposed so the rotational direction of the incoming material to be treated is the same direction as the rotational direction of the hot air current, and the recovery means 10 is also disposed tangentially to the periphery of the treatment compartment 6 so as to maintain the rotational direction of the rotating material to be treated. In addition, the cold air current fed from the cold air current feed means 8 is configured to be fed from a horizontal and tangential direction from the periphery of the apparatus to the circumferential surface within the treatment compartment.

The rotational direction of the material to be treated fed from the powder particle feed port 14, the rotational direction of the cold air current fed from the cold air current feed means 8, and the rotational direction of the hot air current fed from the hot air current feed means 7 are all the same direction. As a consequence, flow perturbations within the treatment compartment 6 do not occur; the rotational flow within the apparatus is reinforced; a strong centrifugal force is applied to the material to be treated prior to the heat treatment; and the dispersity is further enhanced, and as a result the acquisition of a toner particle having few coalesced particles is facilitated.

The method for producing the toner particle in the step of obtaining a toner particle is not particularly limited, and production can be carried out using known methods. Examples here are the pulverization method, emulsion aggregation method, suspension polymerization method, and dissolution suspension method.

A toner particle produced by the pulverization method may be produced, for example, proceeding as follows.

The binder resin, colorant, other optional additives, and so forth are thoroughly mixed using a mixer such as a Henschel mixer or ball mill. The resulting mixture is melt-kneaded using a heated kneader, for example, a twin-screw kneading extruder, hot roll, kneader, or extruder. A wax, magnetic iron oxide particle, and metal-containing compound may also be added at this time.

The melt-kneaded material is cooled and solidified and then pulverized and classified to obtain a toner particle. The embedding ratio of the silica fine particle A at the toner particle surface can be controlled at this point by adjusting the exhaust temperature during fine pulverization. The toner can be obtained by mixing the external additive, e.g., the silica fine particle A, with the toner particle using a mixer such as a Henschel mixer.

The mixer can be exemplified by the following: Henschel mixer (Mitsui Mining Co., Ltd.); Supermixer (Kawata Mfg. Co., Ltd.); Ribocone (Okawara Corporation); Nauta mixer, Turbulizer, and Cyclomix (Hosokawa Micron Corporation); Spiral Pin Mixer (Pacific Machinery & Engineering Co., Ltd.); and Loedige Mixer (Matsubo Corporation).

The kneader can be exemplified by the following: KRC Kneader (Kurimoto, Ltd.); Buss Ko-Kneader (Buss Corp.); TEM extruder (Toshiba Machine Co., Ltd.); TEX twin-screw kneader (The Japan Steel Works, Ltd.); PCM Kneader (Ikegai Ironworks Corporation); three-roll mills, mixing roll mills, and kneaders (Inoue Manufacturing Co., Ltd.); Kneadex (Mitsui Mining Co., Ltd.); Model MS pressure kneader and Kneader-Ruder (Moriyama Mfg. Co., Ltd.); and Banbury mixer (Kobe Steel, Ltd.).

The pulverizer can be exemplified by the following: Counter Jet Mill, Micron Jet, and Inomizer (Hosokawa Micron Corporation); IDS mill and PJM Jet Mill (Nippon Pneumatic Mfg. Co., Ltd.); Cross Jet Mill (Kurimoto, Ltd.); Ulmax (Nisso Engineering Co., Ltd.); SK Jet-O-Mill (Seishin Enterprise Co., Ltd.); Kryptron (Kawasaki Heavy Industries, Ltd.); Turbo Mill (Turbo Kogyo Co., Ltd.); and Super Rotor (Nisshin Engineering Inc.).

As necessary, pulverization may also be followed by the execution of a surface treatment on the toner particle using a Hybridization System (Nara Machinery Co., Ltd.), Nobilta (Hosokawa Micron Corporation), Mechanofusion System (Hosokawa Micron Corporation), Faculty (Hosokawa Micron Corporation), Inomizer (Hosokawa Micron Corporation), Theta Composer (Tokuju Corporation), Mechanomill (Okada Seiko Co., Ltd.), or Meteo Rainbow MR Type (Nippon Pneumatic Mfg. Co., Ltd.) to control an embedding ratio of the silica fine particle A on the surface of the toner particle.

The classifier can be exemplified by the following: Classiel, Micron Classifier, and Spedic Classifier (Seishin Enterprise Co., Ltd.); Turbo Classifier (Nisshin Engineering Inc.); Micron Separator, Turboplex (ATP), and TSP Separator (Hosokawa Micron Corporation); Elbow Jet (Nittetsu Mining Co., Ltd.); Dispersion Separator (Nippon Pneumatic Mfg. Co., Ltd.); and YM Microcut (Yasukawa Shoji Co., Ltd.).

Screening devices that can be used to screen out the coarse particles can be exemplified by the following: Ultrasonic (Koei Sangyo Co., Ltd.), Rezona Sieve and Gyro-Sifter (Tokuju Corporation), Vibrasonic System (Dalton Co., Ltd.), Soniclean (Sintokogio, Ltd.), Turbo Screener (Turbo Kogyo Co., Ltd.), Microsifter (Makino Mfg. Co., Ltd.), and circular vibrating sieves.

A toner particle may be produced by the emulsion aggregation method, for example, proceeding as follows.

Step of Preparing a Resin Fine Particle Dispersion (Preparation Step)

For example, a uniform solution is formed by dissolving a polyester resin and/or a styrene-acrylic resin as the binder resin component in an organic solvent. This is followed on an optional basis by the addition of a basic compound and/or a surfactant. Resin fine particles of the binder resin are formed by the gradual addition of an aqueous medium to this solution while applying shear force to the solution using, for example, a homogenizer. The organic solvent is finally removed to produce a resin fine particle dispersion in which resin fine particles are dispersed.

During the preparation of the resin fine particle dispersion, the amount of addition of the resin component that is dissolved in the organic solvent, expressed relative to 100 parts by mass of the organic solvent, is preferably from 10 parts by mass to 50 parts by mass and more preferably from 30 parts by mass to 50 parts by mass.

Any organic solvent capable of dissolving the resin component may be used, but solvents exhibiting a high solubility for olefin resins, e.g., toluene, xylene, ethyl acetate, and so forth, are preferred.

There are no particular limitations on the surfactant. The following are examples: anionic surfactants such as the salts of sulfate esters, sulfonate salts, carboxylate salts, phosphate esters, and soaps; cationic surfactants such as amine salts and quaternary ammonium salts; and nonionic surfactants such as polyethylene glycols, ethylene oxide adducts on alkylphenols, and polyhydric alcohol systems.

The basic compound can be exemplified by inorganic bases such as sodium hydroxide and potassium hydroxide and by organic bases such as triethylamine, trimethylamine, dimethylaminoethanol, and diethylaminoethanol. A single species of the basic compound may be used by itself or two or more species may be used in combination.

Aggregation Step

The aggregation step, for example, is a step of forming aggregate particles by preparing a mixture by mixing, as necessary, a colorant fine particle dispersion, wax fine particle dispersion, and silicone oil emulsion into the resin fine particle dispersion and then aggregating the fine particles present in the thusly prepared mixture.

A favorable example of the method for forming the aggregate particles is a method in which an aggregating agent is added to and mixed with the mixture and the temperature is raised and/or, e.g., mechanical energy is suitably applied.

The colorant fine particle dispersion is prepared by the dispersion of a colorant as described above. The colorant fine particles are dispersed using a known method, but the use is preferred of, for example, a rotary shear homogenizer; a media-based disperser such as a ball mill, sand mill, or attritor; or a high-pressure countercollision disperser. A surfactant or polymeric dispersing agent that imparts dispersion stability can also be added on an optional basis.

The wax fine particle dispersion and the silicone oil emulsion are prepared by dispersing the respective materials in an aqueous medium. The respective materials may be dispersed using a known method, but the use is preferred of, for example, a rotary shear homogenizer; a media-based disperser such as a ball mill, sand mill, or attritor; or a high-pressure countercollision disperser. A surfactant or polymeric dispersing agent that imparts dispersion stability can also be added on an optional basis.

The aggregating agent can be exemplified by the metal salts of monovalent metals such as sodium, potassium, and so forth; metal salts of divalent metals such as calcium, magnesium, and so forth; metal salts of trivalent metals such as iron, aluminum, and so forth; and polyvalent metal salts such as polyaluminum chloride. Viewed from the standpoint of the ability to control the particle diameter in the aggregation step, metal salts of divalent metals, e.g., calcium chloride, magnesium sulfate, and so forth, are preferred.

The addition and mixing of the aggregating agent is preferably carried out in the temperature range from room temperature to 75° C. When mixing is performed using this temperature condition, it proceeds in a state in which the aggregation is stable. Mixing can be carried out using, for example, a known mixing apparatus, homogenizer, or mixer.

Fusion Step

The fusion step is a step in which the aggregate particle is fused or coalesced, preferably by heating to at least the melting point of the resin component, to produce a particle in which the surface of the aggregate particle has been smoothened.

Prior to the fusion step, for example, a chelating agent, pH regulator, surfactant, and so forth may be introduced as appropriate in order to prevent the obtained resin particles from melt-adhering to each other.

The chelating agent can be exemplified by ethylenediaminetetraacetic acid (EDTA) and its alkali metal salts, for example, its Na salt; sodium gluconate; sodium tartrate; potassium citrate and sodium citrate; nitrilotriacetate (NTA) salts; and highly water-soluble polymers that contain both the COOH and OH functionalities (polyelectrolytes).

With regard to the duration of the fusion step, shorter times will suffice at higher heating temperatures while longer times will be required at lower heating temperatures. Thus, the duration of heating/fusion cannot be unconditionally specified because it depends on the heating temperature; however, it will generally be about from 10 minutes to 10 hours.

Cooling Step

This is a step of cooling the temperature of the resin particle-containing aqueous medium obtained in the fusion step. While not a particular limitation, a specific cooling rate is about 0.1 to 50° C./minute.

Washing Step

The impurities in the resin particle can be removed by subjecting the resin particle produced via the preceding steps to repeated washing and filtration.

Specifically, preferably the resin particle is washed using an aqueous solution containing a chelating agent, e.g., ethylenediaminetetraacetic acid (EDTA) or its Na salt, and is additionally washed with pure water.

The metal salt, surfactant, and so forth in the resin particle can be removed by repeating the pure water wash+filtration a plurality of times. Filtration is performed preferably from 3 to 20 times from the standpoint of the production efficiency, with 3 to 10 times being more preferred.

Drying and Classification Step

The toner particle can be obtained by drying the washed resin particle and carrying out classification as appropriate.

A toner particle produced by the dissolution suspension method may be produced, for example, proceeding as follows.

In the dissolution suspension method, a resin composition is obtained by dissolving the binder resin component such as a polyester resin and a styrene-acrylic resin in an organic solvent; this resin composition is dispersed in an aqueous medium to granulate the resin composition into particles; and the organic solvent present in the resin composition particles is removed to produce a toner particle.

The dissolution suspension method is adaptable as long as the resin component can dissolve in an organic solvent, and in addition provides for easy shape control as a function of the conditions in solvent removal.

A toner production method using the dissolution suspension method is specifically described in the following, but there is no limitation to this.

Resin Component Dissolution Step

In the resin component dissolution step, the binder resin and as necessary other components, e.g., colorant, wax, silicone oil, and so forth, are dissolved or dispersed in an organic solvent to prepare a resin composition.

Any solvent that is an organic solvent that can dissolve the resin component can be used as the organic solvent used here. Specific examples are toluene, xylene, chloroform, methylene chloride, and ethyl acetate. The use of toluene and ethyl acetate is preferred for the ease of solvent removal and promotion of crystallization of crystalline resin.

The amount of use of the organic solvent is not limited, but should be an amount that provides a viscosity that enables the resin composition to disperse and granulate in a poor solvent, e.g., water. Specifically, the mass ratio between the resin component and optional other components, e.g., colorant, wax, and silicone oil, and the organic solvent is preferably 10/90 to 50/50 from the standpoints of the granulatability, infra, and the toner particle production efficiency.

On the other hand, the colorant, wax, and silicone oil need not undergo dissolution in the organic solvent and may undergo dispersion. When the colorant, wax, and silicone oil are employed in a dispersed condition, dispersion is preferably performed using a disperser such as a bead mill.

Granulation Step

The granulation step is a step of producing particles of the obtained resin composition by dispersing the resin composition in an aqueous medium using a dispersing agent so as to provide a prescribed toner particle diameter.

Water is mainly used as the aqueous medium.

In addition, this aqueous medium preferably contains from 1 mass % to 30 mass % of a monovalent metal salt. The incorporation of the monovalent metal salt serves to suppress diffusion of the organic solvent in the resin composition into the aqueous medium and to increase the crystallinity of the resin component present in the resulting toner particle.

This facilitates the appearance of an excellent antiblocking behavior by the toner and facilitates the appearance of an excellent particle size distribution for the toner.

The monovalent metal salt can be exemplified by sodium chloride, potassium chloride, lithium chloride, and potassium bromide, whereamong sodium chloride and potassium chloride are preferred.

In addition, the mixing ratio (mass ratio) between the aqueous medium and resin composition is preferably aqueous medium/resin composition=90/10 to 50/50.

There are no particular limitations on the dispersing agent, and a cationic, anionic, or nonionic surfactant is used as an organic dispersing agent, wherein anionic surfactants are preferred.

Examples here sodium alkylbenzenesulfonate, sodium α-olefinsulfonate, sodium alkylsulfonate, and sodium alkyl diphenyl ether disulfonate. Inorganic dispersing agents, on the other hand, can be exemplified by tricalcium phosphate, hydroxyapatite, calcium carbonate fine particles, titanium oxide fine particles, and silica fine particles.

The inorganic dispersing agent tricalcium phosphate is preferred among the preceding. The reasons for this are its granulation performance and stability and because it has very little negative effect on the properties of the resulting toner.

The amount of addition of the dispersing agent is determined in conformity to the particle diameter of the granulate, and larger amounts of dispersing agent addition provide smaller particle diameters. Due to this, the amount of addition for the dispersing agent will vary depending on the desired particle diameter, but use in the range of 0.1 to 15.0 mass % with reference to the resin composition is preferred.

The production of the resin composition particles in the aqueous medium is preferably carried out under the application of high-speed shear. Devices that apply high-speed shear can be exemplified by various high-speed dispersers and ultrasound dispersers.

Solvent Removal Step

In the solvent removal step, the organic solvent contained in the resulting resin composition particle is removed to produce a toner particle. This organic solvent removal may be performed while stirring.

Washing, Drying, and Classification Step

After the solvent removal step, a washing and drying step may be executed in which washing is performed a plurality of times with, e.g., water, and the toner particle is then filtered off and dried. When a dispersing agent that dissolves under acidic conditions, e.g., tricalcium phosphate, has been used as the dispersing agent, preferably washing with, e.g., hydrochloric acid, is carried out followed by washing with water. The execution of washing can remove the dispersing agent used for granulation. The toner particle can be obtained by following washing with filtration, drying, and classification as appropriate.

A toner particle produced by the suspension polymerization method may be produced, for example, as follows.

A polymerizable monomer composition is prepared in which polymerizable monomer that will produce the binder resin, colorant, a wax component, a polymerization initiator, and so forth, are dissolved or dispersed to uniformity using a disperser such as a homogenizer, ball mill, ultrasound disperser, and so forth. After granulation of the polymerizable monomer composition into particles by dispersing the polymerizable monomer composition in an aqueous medium, a toner particle is obtained by polymerizing the polymerizable monomer in the particles composed of the polymerizable monomer composition.

This polymerizable monomer composition preferably is a polymerizable monomer composition prepared by mixing a dispersion of the colorant dispersed in a first polymerizable monomer (or a portion of the polymerizable monomer) with at least a second polymerizable monomer (or the remaining polymerizable monomer). That is, the presence of the colorant in the polymer particle in a more thoroughly dispersed state can be achieved by bringing the colorant into a thoroughly dispersed state in the first polymerizable monomer and subsequently mixing with the second polymerizable monomer along with other toner materials.

As necessary, the obtained toner particle may be filtered, washed, dried, and classified using known methods.

Step of Adding External Additive to the Toner Particle

Toner can be obtained by mixing the toner particle and external additive (silica fine particle A and optionally silica fine particle B), i.e., the obtained toner particle and external additive, using a mixer such as a Henschel mixer.

When both silica fine particle A and silica fine particle B are used, silica fine particle A and silica fine particle B may be externally added to the toner particle once. As noted above, the external addition of silica fine particle A and the external addition of silica fine particle B are preferably carried out divided up.

In the step of externally adding the silica fine particle A to the obtained toner particle by mixing, the silica fine particle A may be mixed with the toner particle, for example, using a mixer such as a Henschel mixer.

Then, in a step of heat treating the toner particle to which the silica fine particle A has been externally added by mixing, preferably the heat treatment is carried out using the heat treatment apparatus described above and using, as the material to be treated, the toner particle to which the silica fine particle A has been externally added by mixing.

In a step of externally adding the silica fine particle B to the heat-treated toner particle by mixing, the silica fine particle B may be mixed with the toner particle after heat treatment, for example, using a mixer such as a Henschel mixer, to obtain the toner.

The weight-average particle diameter (D4) of the toner is 4.0 to 15.0 μm. 4.0 to 9.0 μm is preferred and 6.0 to 8.0 μm is more preferred.

As a result of this, the silica fine particle A can suitably coat the toner particle, and in addition the area of contact between the silica fine particle A and the toner particle is optimized, a better charge stability is provided, there will be little fluctuation in the image density even in the event of changes in the environment, and changes in the image density during continuous printing can be suppressed.

The weight-average particle diameter (D4) of the toner can be adjusted, for example, by carrying out classification of the toner particle.

Method for Measuring Weight-Average Particle Diameter (D4) of Toner

The weight-average particle diameter (D4) of the toner is calculated by using a precision particle diameter distribution measuring device "Coulter Counter Multisizer 3" (registered trademark, manufactured by Beckman Coulter, Inc.), which is based on a pore electrical resistance method and equipped with a 100 μm aperture tube, and dedicated software "Beckman Coulter Multisizer 3 Version 3.51" (manufactured by Beckman Coulter, Inc.) provided therewith for setting measurement conditions and analyzing the measurement data, performing measurements at the number of effective measurement channels of 25,000 and analyzing the measurement data.

For the electrolytic aqueous solution used for measurement, a solution in which special grade sodium chloride is dissolved in ion-exchanged water so that the concentration is about 1% by mass, for example, "ISOTON II" (manufactured by Beckman Coulter, Inc.) can be used.

Before performing the measurement and analysis, the dedicated software is set as follows.

At the "Change Standard Measurement Method (SOM) Screen" of the dedicated software, the total number of counts in control mode is set to 50,000 particles, the number of measurements is set to 1, and a value obtained using "Standard Particle 10.0 μm" (manufactured by Beckman Coulter Co., Ltd.) is set as the Kd value. The threshold and noise level are automatically set by pressing the threshold/noise level measurement button. Also, the current is set to 1600 μA, the gain is set to 2, the electrolytic solution is set to ISOTON II, and the flash of aperture tube after measurement is checked.

At the "Pulse to Particle Diameter Conversion Setting Screen" of the dedicated software, the bin interval is set to logarithmic particle diameter, the particle diameter bin is set to a 256 particle diameter bin, and the particle diameter range is set to from 2 μm to 60 μm.

The specific measurement method is as follows.

(1) About 200 ml of the electrolytic aqueous solution is placed in a 250 ml round-bottom glass beaker exclusively provided for Multisizer 3, the beaker is set on a sample stand, and a stirrer rod is stirred counterclockwise at 24 revolutions/second. Then, the dirt and air bubbles inside the aperture tube are removed using the "Flush Aperture Tube" function of the dedicated software.

(2) About 30 ml of the electrolytic aqueous solution is placed in a 100 ml flat-bottomed glass beaker, and about 0.3 ml of a diluent obtained by 3-fold by mass dilution of "CONTAMINON N" (a 10% by mass aqueous solution of a neutral detergent for washing precision measuring instruments at pH 7, which consists of a nonionic surfactant, an anionic surfactant, and an organic builder, manufactured by Wako Pure Chemical Industries, Ltd.) as a dispersing agent with ion-exchanged water is added thereto.

(3) A predetermined amount of ion-exchanged water is placed in a water tank of an ultrasonic disperser "Ultrasonic Dispersion System Tetora 150" (manufactured by Nikkaki Bios Co., Ltd.) having an electrical output of 120 W and containing two oscillators with an oscillation frequency of 50 kHz that are built in with a phase shift of 180 degrees, and about 2 ml of the CONTAMINON N is added to the water tank.

(4) The beaker of (2) is set in the beaker fixing hole of the ultrasonic disperser and the ultrasonic disperser is operated. The height position of the beaker is adjusted so that the resonance state of the liquid level of the electrolytic aqueous solution in the beaker is maximized.

(5) While the electrolytic aqueous solution in the beaker in (4) above is being irradiated with ultrasonic waves, about 10 mg of toner is added little by little to the electrolytic aqueous solution and dispersed. Then, the ultrasonic dispersion treatment is continued for another 60 sec. In the ultrasonic dispersion, the temperature of water in the water tank is appropriately adjusted to from 10° C. to 40° C.

(6) The electrolytic aqueous solution of (5) in which the toner is dispersed is dropped using a pipette into the round-bottomed beaker of (1) installed in the sample stand, and the measured concentration is adjusted to about 5%. The measurement is continued until the number of measured particles reaches 50,000.

(7) The measurement data are analyzed with the dedicated software provided with the device, and the weight-average particle diameter (D4) is calculated. The weight-average particle diameter (D4) is the "average diameter" on the analysis/volume statistics (arithmetic mean) screen when graph/vol % is set using the dedicated software.

EXAMPLES

The basic constitution and features of the present disclosure are described in the preceding, while the present disclosure is specifically described in the following based on examples. However, the present disclosure is in no way limited thereby. Unless specifically indicated otherwise, parts and % are on a mass basis.

Binder Resin 1 Production Example

Bisphenol A/ethylene oxide (2.2 mol adduct): 50.0 mol parts
Bisphenol A/propylene oxide (2.2 mol adduct): 50.0 mol parts
Terephthalic acid: 90.0 mol parts
Trimellitic anhydride: 10.0 mol parts 100 parts by mass of the above-indicated monomer constituting polyester units was mixed in a 5-liter autoclave together with 500 ppm titanium tetrabutoxide.

A reflux condenser, water separation device, $N_2$ gas introduction line, thermometer, and stirring device were then installed on the autoclave and a condensation polymerization reaction was run at 230° C. while introducing $N_2$ gas into the autoclave. The reaction time was adjusted to provide the desired softening point, and, after the completion of the reaction, removal from the container, cooling, and pulverization yielded the binder resin 1. Binder resin 1 had a softening point of 130° C. and a Tg of 57° C.

The softening point was measured as follows.

Measurement of the Softening Point

The softening point is measured using a "Flowtester CFT-500D Flow Property Evaluation Instrument" (Shimadzu Corporation), which is a constant-load extrusion-type capillary rheometer, in accordance with the manual provided with the instrument. With this instrument, while a constant load is applied by a piston from the top of the measurement sample, the measurement sample filled in a cylinder is heated and melted and the melted measurement sample is extruded from a die at the bottom of the cylinder; a flow curve showing the relationship between piston stroke and temperature can be obtained from this.

The "melting temperature by the ½ method", as described in the manual provided with the "Flowtester CFT-500D Flow Property Evaluation Instrument", is used as the softening point.

The melting temperature by the ½ method is determined as follows.

First, ½ of the difference between the piston stroke Smax at the completion of outflow and the piston stroke Smin at the start of outflow is determined (this value is designated as X, where X=(Smax−Smin)/2). The temperature in the flow curve when the piston stroke in the flow curve reaches the sum of X and Smin is the melting temperature by the ½ method.

The measurement sample used is prepared by subjecting approximately 1.3 g of the sample to compression molding for 60 seconds at 10 MPa in a 25° C. environment using a tablet compression molder (for example, NT-100H, NPa System Co., Ltd.) to provide a cylindrical shape with a diameter of approximately 8 mm. The measurement conditions with the CFT-500D are as follows.

Test mode: ramp-up method
Start temperature: 50° C.
Saturated temperature: 200° C.
Measurement interval: 1.0° C.
Ramp rate: 4.0° C./min
Piston cross section area: 1.000 $cm^2$
Test load (piston load): 10.0 $kgf/cm^2$ (0.9807 MPa)
Preheating time: 300 seconds
Diameter of die orifice: 1.0 mm
Die length: 1.0 mm

Silica Fine Particle A1 Production Example 500 g of fumed silica with a number-average particle diameter of 120 nm (the silica fine particle substrate) was introduced into a stainless steel (SUS304) reactor connected to a vacuum pump; the pressure in the reactor was reduced to 0.001 Pa; and heating and stirring were carried out with the temperature in the reactor controlled to 330° C. A degassing treatment was run for 30 minutes under these conditions; then, while introducing a vapor of octamethylcyclotetrasiloxane as the surface treatment agent and supplying same at 6 g/minute, the aperture on the valve between the vacuum pump and the reactor was adjusted to control the pressure in the reactor to 1 Pa. A surface treatment was performed on the silica fine particle substrate under these conditions by stirring and heating for 20 minutes. The amount of octamethylcyclotetrasiloxane introduced in this step was a total of 120 g.

The interior of the reactor was then pumped down to 0.001 Pa in order to remove unreacted surface treatment agent. After a degassing treatment under these conditions for 30 minutes, the octamethylcyclotetrasiloxane vapor surface treatment agent was again introduced at a supply rate of 6 g/minute while controlling the pressure in the reactor to 1 Pa. A second surface treatment was performed on the silica fine particles by heating and stirring under these conditions for 20 minutes. The amount of octamethylcyclotetrasiloxane introduced in this step was a total of 120 g.

The interior of the reactor was subsequently pumped down to 0.001 Pa in order to remove unreacted surface treatment agent. After a degassing treatment under these conditions for 30 minutes, the octamethylcyclotetrasiloxane vapor surface treatment agent was again introduced at a supply rate of 6 g/minute while controlling the pressure in the reactor to 1 Pa. A third surface treatment was performed on the silica fine particles by heating and stirring under these conditions for 20 minutes. The amount of octamethylcyclotetrasiloxane introduced in this step was a total of 120 g.

While continuing to heat and stir in the same way, the interior of the reactor was subsequently pumped down to 0.001 Pa to remove unreacted surface treatment agent and provide the silica fine particle A1. The properties of the obtained silica fine particle A1 are given in Tables 1-1 and 1-2.

Silica Fine Particle A2 Production Example 500 g of fumed silica with a number-average particle diameter of 120 nm (the silica fine particle substrate) was introduced into a stainless steel (SUS304) reactor connected to a vacuum pump; the pressure in the reactor was reduced to 0.001 Pa; and heating and stirring were carried out with the temperature in the reactor controlled to 330° C. A degassing treatment was run for 30 minutes under these conditions; then, while introducing a vapor of octamethylcyclotetrasiloxane as the surface treatment agent and supplying same at 6 g/minute, the aperture on the valve between the vacuum pump and the reactor was adjusted to control the pressure in the reactor to 10 Pa. A surface treatment was performed on the silica fine particle substrate under these conditions by stirring and heating for 60 minutes.

While continuing to heat and stir in the same way, the interior of the reactor was subsequently pumped down to 0.001 Pa to remove unreacted surface treatment agent and provide the silica fine particle A2. The properties of the obtained silica fine particle A2 are given in Tables 1-1 and 1-2.

Silica Fine Particle A3 Production Example 500 g of fumed silica with a number-average particle diameter of 120 nm (the silica fine particle substrate) was introduced into a reactor and heating and stirring were carried out under a nitrogen purge with the temperature in the reactor controlled to 330° C.

A vapor of octamethylcyclotetrasiloxane as surface treatment agent was then fed into the reactor at 10 g/minute for 60 minutes. This was followed by heating and stirring for 180 minutes to carry out the surface treatment of the silica fine particle substrate.

The silica fine particle A3 was then obtained by purging the interior of the reactor with nitrogen in order to remove unreacted surface treatment agent and nitrogen. The properties of the obtained silica fine particle A3 are given in Tables 1-1 and 1-2.

Silica Fine Particles A4 to A11 Production Example

Proceeding as for silica fine particle A3, production was carried out using fumed silica with the number-average particle diameter shown in Table 1-1 and changing the surface treatment agent and treatment conditions as shown in Tables 1-1 and 1-2. The properties of the resulting silica fine particles A4 to A11 are given in Tables 1-1 and 1-2.

Silica Fine Particle B12 Production Example 500 g of fumed silica with a number-average particle diameter of 15 nm (the silica fine particle substrate) was introduced into a reactor and heating and stirring were carried out under a nitrogen purge with the temperature in the reactor controlled to 330° C.

A vapor of octamethylcyclotetrasiloxane as surface treatment agent was subsequently fed into the reactor at 10 g/minute for 60 minutes. This was followed by heating and stirring for 180 minutes to carry out the surface treatment of the silica fine particle substrate.

The unreacted surface treatment agent was then removed by reducing the pressure, and, while stirring under a nitrogen purge, a solution of 50 g of polydimethylsiloxane (kinematic viscosity at a temperature of 25° C.: 100 $mm^2/s$) diluted with 500 g of hexane was supplied by spray atomization. Surface treatment of the silica fine particle substrate was subsequently carried out for 60 minutes with heating and stirring to obtain silica fine particle B12. The properties of the resulting silica fine particle B12 are given in Table 2.

Silica Fine Particle B13 Production Example

Proceeding as for silica fine particle B12, production was carried out using fumed silica with the number-average particle diameter shown in Table 2 and changing the surface treatment conditions as shown in Table 2. The properties of the resulting silica fine particle B13 are given in Table 2.

Silica Fine Particles 14 to 16 Production Example

Proceeding as for silica fine particle 3, production was carried out using fumed silica with the number-average particle diameter shown in Table 1-1 and changing the surface treatment conditions as shown in Table 1-1. The properties of the resulting silica fine particles 14 to 16 are given in Tables 1-1 and 1-2.

Silica Fine Particle 17 Production Example 500 g of fumed silica with a number-average particle diameter of 120 nm (the silica fine particle substrate) was introduced into a reactor and heating and stirring were carried out under a nitrogen purge with the temperature in the reactor controlled to 330° C.

A solution of 50 g of polydimethylsiloxane (kinematic viscosity at a temperature of 25° C.: 50 $mm^2/s$, average number of repeat units n=60) as the surface treatment agent diluted with 500 g of hexane was supplied by spray atomization. Surface treatment of the silica fine particle substrate was subsequently carried out for 60 minutes with heating and stirring to obtain silica fine particle 17. The properties of the resulting silica fine particle 17 are given in Tables 1-1 and 1-2.

Silica Fine Particles 18 and 19 Production Example

Proceeding as for silica fine particle 17, production was carried out changing the surface treatment agent and treatment conditions as shown in Table 1-1. The properties of the resulting silica fine particles 18 and 19 are given in Tables 1-1 and 1-2.

TABLE 1-1

| Silica fine particle | Surface treatment agent | Treatment agent amount (g) | Treatment agent amount (parts) | Treatment temperature (° C.) | Treatment time (min) | Number-average particle diameter (nm) |
|---|---|---|---|---|---|---|
| A1 | Octamethylcyclotetrasiloxane | 360 | 72 | 330° C. | 60 | 120 |
| A2 | Octamethylcyclotetrasiloxane | 360 | 72 | 330° C. | 60 | 120 |
| A3 | Octamethylcyclotetrasiloxane | 600 | 120 | 330° C. | 180 | 120 |
| A4 | Octamethylcyclotetrasiloxane | 480 | 96 | 330° C. | 120 | 120 |
| A5 | Octamethylcyclotetrasiloxane | 360 | 72 | 330° C. | 60 | 50 |
| A6 | Octamethylcyclotetrasiloxane | 360 | 72 | 300° C. | 60 | 200 |
| A7 | Octamethylcyclotetrasiloxane | 350 | 70 | 330° C. | 60 | 50 |
| A8 | Octamethylcyclotetrasiloxane | 350 | 70 | 330° C. | 60 | 45 |
| A9 | Octamethylcyclotetrasiloxane | 240 | 48 | 300° C. | 30 | 8 |
| A10 | Hexamethylcyclotrisiloxane | 240 | 48 | 300° C. | 30 | 310 |
| A11 | Decamethylcyclopentasiloxane | 240 | 48 | 300° C. | 30 | 310 |
| 14 | Hexamethyldisilazane | 180 | 36 | 170° C. | 60 | 120 |
| 15 | Octamethylcyclotetrasiloxane | 180 | 36 | 280° C. | 30 | 120 |
| 16 | 50/50 mixture of hexamethylcyclotrisiloxane/ decamethylcyclopentasiloxane | 180 | 36 | 280° C. | 60 | 120 |
| 17 | Polydimethylsiloxane | 50 | 10 | 330° C. | 60 | 120 |
| 18 | Polydimethylsiloxane | 50 | 10 | 250° C. | 60 | 120 |
| 19 | Dimethyldichlorosilane | 50 | 10 | 250° C. | 30 | 120 |

TABLE 1-2

| Silica fine particle | Amount of moisture adsorption ($cm^3/m^2$) | (SD2 + SD1)/SD1 | WD2 | Ca | Reduction ratio ΔC (%) | Average circularity |
|---|---|---|---|---|---|---|
| A1 | 0.043 | 2.2 | 2.0 | 7.0 | 1.0 or less | 0.945 |
| A2 | 0.048 | 2.2 | 2.0 | 6.6 | 1.0 or less | 0.945 |
| A3 | 0.054 | 2.4 | 2.2 | 5.8 | 1.0 or less | 0.945 |
| A4 | 0.059 | 2.8 | 2.4 | 4.7 | 1.0 or less | 0.945 |
| A5 | 0.034 | 2.9 | 2.8 | 4.2 | 1.0 or less | 0.925 |
| A6 | 0.066 | 3.0 | 2.9 | 3.0 | 1.0 or less | 0.920 |
| A7 | 0.090 | 2.9 | 2.4 | 3.2 | 1.0 or less | 0.925 |
| A8 | 0.085 | 2.9 | 2.3 | 3.4 | 1.0 or less | 0.922 |
| A9 | 0.106 | 3.6 | 3.2 | 3.9 | 1.0 or less | 0.880 |

TABLE 1-2-continued

| Silica fine particle | Amount of moisture adsorption ($cm^3/m^2$) | (SD2 + SD1)/SD1 | WD2 | Ca | Reduction ratio ΔC (%) | Average circularity |
|---|---|---|---|---|---|---|
| A10 | 0.119 | 1.4 | 4.2 | 3.0 | 1.0 or less | 0.896 |
| A11 | 0.131 | 3.5 | 5.1 | 2.9 | 1.0 or less | 0.896 |
| 14 | 0.054 | — | — | — | — | 0.945 |
| 15 | 0.075 | 4.6 | 7.1 | 6.4 | 1.0 or less | 0.945 |
| 16 | 0.086 | 4.1 | 6.5 | 6.0 | 1.0 or less | 0.945 |
| 17 | 0.097 | 7.5 | 0.9 | 11.0 | 7.0 | 0.945 |
| 18 | 0.091 | 24.9 | 0.8 | 13.7 | 61.0 | 0.945 |
| 19 | 0.226 | 1.0 | 2.2 | 0.9 | 1.0 or less | 0.945 |

TABLE 2-1

| Silica fine particle No. | Number-average particle diameter (nm) | First-stage treatment conditions | | | | |
|---|---|---|---|---|---|---|
| | | Surface treatment agent | Surface treatment amount (g) | Surface treatment amount (parts) | Treatment temperature (° C.) | Treatment time (min) |
| B12 | 15 | Octamethylcyclotetrasiloxane | 600 | 120 | 330° C. | 180 |
| B13 | 7 | Octamethylcyclotetrasiloxane | 600 | 120 | 330° C. | 180 |

TABLE 2-2

| Silica fine particle No. | Second-stage treatment conditions | | | | | Amount of moisture adsorption ($cm^3/m^2$) |
|---|---|---|---|---|---|---|
| | Surface treatment agent | Kinematic viscosity at a temperature of 25° C. ($mm^2/s$) | Treatment agent amount (parts) | Treatment temperature (° C.) | Treatment time (min) | |
| B12 | Polydimethylsiloxane | 100 | 10 | 330° C. | 120 | 0.019 |
| B13 | Polydimethylsiloxane | 100 | 10 | 330° C. | 60 | 0.025 |

In Tables 1-1, 2-1, and 2-2, the treatment agent amount (parts) indicates the number of parts by mass of the surface treatment agent relative to 100 parts by mass of the silica fine particle substrate; SD1 indicates the area of the peak corresponding to silicon atom having the D1 unit structure; SD2 indicates the area of the peak corresponding to silicon atom having the D2 unit structure; WD2 indicates the full width at half maximum of the peak corresponding to silicon atom having the D2 unit structure; the reduction ratio ΔC (%) indicates the reduction ratio for the amount of siloxane chain occurrence post-hexane wash relative to that pre-hexane wash; and Ca is the value calculated with (SD1+SD2)/SQ×100 (Formula (a)).

Example 1

Toner 1 Production Example

| | |
|---|---|
| Binder resin 1 | 100 parts |
| Paraffin wax (melting point: 78° C.) | 4 parts |
| C.I. Pigment Blue 15:3 | 4 parts |

The materials listed above were preliminarily mixed using a Henschel mixer (product name: Model FM-10C, Nippon Coke & Engineering Co., Ltd.), followed by melt-kneading at 160° C. using a twin-screw kneader extruder.

The resulting kneaded material was cooled and coarsely pulverized using a hammer mill and was subsequently finely pulverized using a Turbo mill.

The obtained finely pulverized material was classified using a Coanda effect-based multi-grade classifier to obtain a toner particle 1 having a weight-average particle diameter (D4) of 6.5 μm.

The external addition of the silica fine particle A1 was then carried out on the resulting toner particle 1 using a first external addition treatment as described in the following.

Toner base particle 1: 100 parts

Silica fine particle A1: 4.0 parts

These materials were mixed using a Henschel mixer. The operating conditions for the Henschel mixer were a rotation rate of 4,000 rpm and a rotation time of 2 min, and the heating temperature was room temperature.

Figure 2:
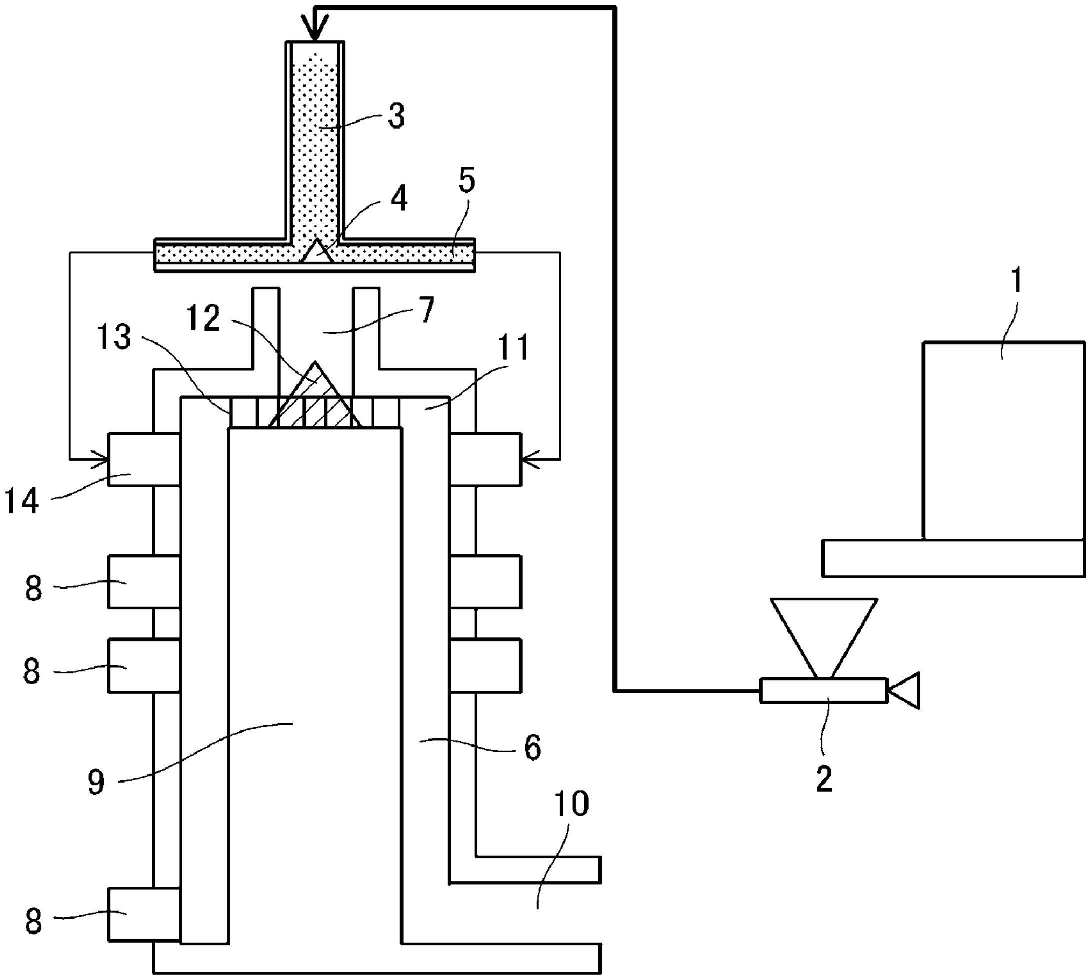
FIG. 2 is a schematic diagram of a heat treatment apparatus.

A heat treatment was then performed using the surface heat treatment apparatus shown in FIG. 2 in order to imbed a portion of the silica fine particle A in the surface of the toner base particle. The operating conditions for the surface heat treatment apparatus were as follows: feed rate=1.0 kg/hr, hot air current temperature=180° C., hot air current flow rate=1.4 $m^3$/minute, cold air current temperature E=3° C., and cold air current flow rate=1.2 $m^3$/minute.

Using a Coanda effect-based wind force classifier ("Elbow Jet Labo EJ-L3", Nittetsu Mining Co., Ltd.), the coarse powder and fines were then classified and removed at the same time to yield a toner particle 1 having the silica fine particle A1 embedded in the surface. A silica fine particle was externally added to the thusly obtained heat-treated toner particle 1 in a second external addition treatment as described in the following.

Toner particle 1 having silica fine particle A1 embedded in the surface: 100 parts Silica fine particle A1: 1.6 parts Silica fine particle B12: 0.8 parts These materials were mixed using a Henschel mixer (product name: Model FM-10C, Nippon Coke & Engineering Co., Ltd.) at a rotation rate of 67 $s^{-1}$ (4,000 rpm) for a rotation time of 2 min and at an external addition temperature of room temperature; this was followed by passage across an ultrasound vibrating screen with an aperture of 54 μm to provide the toner 1. The silica fine particle embedding ratio for the resulting toner is given in Table 3.

Magnetic Carrier Core Particle 1 Production Example

Step 1 (Weighing and Mixing Step)

| | |
|---|---|
| $Fe_2O_3$ | 68.3 mass % |
| $MnCO_3$ | 28.5 mass % |
| $Mg(OH)_2$ | 2.0 mass % |
| $SrCO_3$ | 1.2 mass % |

These ferrite starting materials were weighed out; 20 parts water was added to 80 parts of the ferrite starting materials; and a slurry was then prepared by wet mixing for 3 hours using a ball mill and zirconia with a diameter (o) of 10 mm. The solids fraction concentration in the slurry was 80 mass %.

Step 2 (Prefiring Step)

The mixed slurry was dried using a spray dryer (Ohkawara Kakohki Co., Ltd.), followed by firing in a batch electric furnace for 3.0 hours at a temperature of 1050° C. in a nitrogen atmosphere (1.0 volume % oxygen concentration) to produce a prefired ferrite.

Step 3 (Pulverization Step)

The prefired ferrite was pulverized to approximately 0.5 mm using a crusher, and water was then added to prepare a slurry. The solids fraction concentration of this slurry was brought to 70 mass %. Milling was carried out for 3 hours using a wet ball mill and ⅛-inch stainless steel beads to obtain a slurry. This slurry was additionally milled for 4 hours using a wet bead mill and zirconia with a diameter of 1 mm to obtain a prefired ferrite slurry having a 50% particle diameter on a volume basis (D50) of 1.3 μm.

Step 4 (Granulation Step)

1.0 parts of ammonium polycarboxylate as a dispersing agent and 1.5 parts of polyvinyl alcohol as a binder were added to 100 parts of the prefired ferrite slurry, followed by granulation into spherical particles and drying using a spray dryer (Ohkawara Kakohki Co., Ltd.). The particle size of the obtained granulate was adjusted followed by heating for 2 hours at 700° C. using a rotary electric furnace to remove the organic component, e.g., the dispersing agent and binder.

Step 5 (Firing Step)

Firing was carried out in a nitrogen atmosphere (1.0 volume % oxygen concentration) using 2 hours for the time from room temperature to the firing temperature (1100° C.) and holding for 4 hours at a temperature of 1100° C. This was followed by dropping the temperature to a temperature of 60° C. over 8 hours, returning the nitrogen atmosphere to the atmosphere, and removing at a temperature not above 40° C.

Step 6 (Screening Step)

The aggregated particles were crushed; the coarse particles were then removed by screening across a screen with an aperture of 150 μm; the fines were removed using wind force classification; and the weakly magnetic component was removed by magnetic screening to obtain a porous magnetic core particle 1.

Step 7 (Filling Step)

100 parts of the porous magnetic core particle 1 was introduced into the stirring container of a mixer/stirrer (Model NDMV All-Purpose Stirrer, Dalton Corporation), and 5 parts of a fill resin, comprising 95.0 mass % methylsilicone oligomer and 5.0 mass % γ-aminopropyltrimethoxysilane, was added dropwise at normal pressure while holding the temperature at 60° C.

After completion of the dropwise addition, stirring was continued while adjusting the time, and the temperature was raised to 70° C. to fill the resin composition into the individual porous magnetic core particles.

After cooling, the resulting resin-filled magnetic core particles were transferred to a mixer having a spiral impeller in a rotatable mixing container (Model UD-AT drum mixer, Sugiyama Heavy Industrial Co., Ltd.), and the temperature was raised under a nitrogen atmosphere at a ramp rate of 2° C./minute to 140° C. while stirring. This was followed by continuing to heat and stir at 140° C. for 50 minutes.

This was followed by cooling to room temperature, removal of the cured resin-filled ferrite particles, and removal of the nonmagnetic material using a magnetic screener. The coarse particles were removed using a vibrating screen to obtain a resin-filled magnetic carrier core particle 1.

Coating Resin Production Example

| | |
|---|---|
| Cyclohexyl methacrylate monomer | 26.8 mass % |
| Methyl methacrylate monomer | 0.2 mass % |
| Methyl methacrylate macromonomer (macromonomer having the methacryloyl group at one terminal and having a weight-average molecular weight of 5,000; this is given by Formula (B) wherein A is a polymer of methyl methacrylate) | 8.4 mass % |
| Toluene | 31.3 mass % |
| Methyl ethyl ketone | 31.3 mass % |
| Azobisisobutyronitrile | 2.0 mass % |

Of these materials, the cyclohexyl methacrylate monomer, methyl methacrylate monomer, methyl methacrylate macromonomer, toluene, and methyl ethyl ketone were introduced into a four-neck separable flask fitted with a reflux condenser, thermometer, nitrogen introduction line, and stirrer. Nitrogen gas was introduced into the separable flask to thoroughly establish a nitrogen atmosphere, and this was followed by heating to 80° C., the addition of the azobisisobutyronitrile, and polymerization for 5 hours under reflux.

Hexane was poured into the resulting reaction product to precipitate the copolymer.

The resulting precipitate was separated by filtration and vacuum dried to obtain a resin.

30 parts of this resin was dissolved in a mixed solvent of 40 parts of toluene and 30 parts of methyl ethyl ketone to obtain a resin solution (solids concentration=30%).

Coating Resin Solution Production Example

| | |
|---|---|
| Resin solution (30% solids concentration) | 33.3 mass % |
| Toluene | 66.4 mass % |
| Carbon black (Regal 330, Cabot Corporation) | 0.3 mass % |

(number-average primary particle diameter: 25 nm, specific surface area by nitrogen adsorption: 94 $m^2$/g, DBP absorption: 75 mL/100 g)

The materials listed above were introduced into a paint shaker and were dispersed for 1 hour using zirconia beads having a diameter of 0.5 mm. The obtained dispersion was filtered across a 5.0-μm membrane filter to obtain a coating resin solution.

Magnetic Carrier 1 Production Example

The coating resin solution and the magnetic carrier core particles (the amount of introduction of the coating resin solution was 2.5 parts as the resin component per 100 parts of the magnetic carrier core particle 1) were introduced into a vacuum-degassing kneader being maintained at normal temperature.

After the introduction, stirring was performed for 15 minutes at a stirring rate of 30 rpm and the solvent was evaporated by at least a prescribed amount (80%) followed by raising the temperature to 80° C. while mixing under reduced pressure, distilling off the toluene over 2 hours, and cooling.

The low magnetic force product was separated from the resulting magnetic carrier using a magnetic force screening, and the magnetic carrier was then passed through a sieve having an aperture of 70 μm and was classified using a wind force classifier to obtain a magnetic carrier 1 having a 50% particle diameter (D50) on a volume basis of 38.2 μm.

Two-Component Developer 1 Production, and Evaluations

A two-component developer 1 was produced by mixing the toner 1 and the magnetic carrier 1 so as to provide a toner concentration of 8.0 mass %; mixing was performed using a V-mixer (Model V-10, Tokuju Kosakusho Co., Ltd.) at 0.5 $s^{-1}$ for a rotation time of 5 minutes. The following evaluations were carried out using the obtained two-component developer 1.

Evaluations

An imagePRESS C850 (Canon, Inc.) was used as the image-forming machine; the fixing unit was removed to the exterior, the fixation temperature was made freely controllable, and the image-forming speed was modified so as to output 105 prints/minute in A4 size. In addition, the development contrast was made adjustable by any value and autocorrection by the main unit was disengaged. The frequency of the alternating electric field was fixed at 2.0 kHz, and the peak-to-peak voltage (Vpp) was configured so the Vpp could be varied in 0.1 kV steps from 0.7 kV to 1.8 kV.

The two-component developer 1 was introduced into the developing device at the cyan position of this image-forming machine, the charging voltage VD of the electrostatic latent image bearing member and the laser power were adjusted, and the following evaluations were performed. The evaluation was performed at two levels in each of the evaluations: an image-forming speed of 105 prints/minute at A4 size and an image-forming speed of 85 prints/minute at A4 size.

White paper (product name: CS-814 (A4, 81.4 $g/m^2$), Canon Marketing Japan Inc.) was used as the evaluation paper.

Evaluation of the Temporal Stability of the Printed Image

Operating in a normal-temperature, normal-humidity environment (temperature 23° C., 50% relative humidity, also referred to hereafter as the "N/N environment") and adjusting the development contrast at the copier unit, the reflection density of the output image was measured using an optical densitometer and setting was made to provide a reflection density of 1.48 to 1.52. Five image prints were output using the aforementioned image formation conditions, the density was measured on each of the output images, and the arithmetic average of the image densities of the five prints was determined to give the image density A.

Then, while operating in a high-temperature, high-humidity environment (temperature 30° C., 80% relative humidity, also referred to hereafter as the "H/H environment"), the copier unit was held, with the development contrast set in the N/N environment remaining unchanged, for 24 hours in the H/H environment. This was followed by the output of five image prints, measurement of the density of each of the output images, and determination of the arithmetic average of the image densities of the five prints to give the image density B.

An X-Rite color reflection densitometer (X-Rite, Incorporated) was used as the optical densitometer.

The density variation given by the following formula was calculated and the image density stability was evaluated using this density variation. A density variation of less than 0.14 was assessed as good.

density variation=|image density *A*−image density *B*|

A: less than 0.06

B: 0.06 or more and less than 0.10

C: 0.10 or more and less than 0.14

D: 0.14 or more and less than 0.18

E: 0.18 or more

Evaluation of the Density Stability Versus Changes in the Use Environment from a Normal-Temperature, Low-Humidity Environment to a High-Temperature, High-Humidity Environment Using a copier unit that had been held for 72 hours in a normal-temperature, low-humidity environment (temperature 23° C., 5% relative humidity, also referred to hereafter as the "N/L environment"), and while operating in the N/L environment, the development contrast was adjusted and a setting was established such that the reflection densities of the output image became the reflection densities of the patterns 1 to 8 indicated below. One print of an image having patterns 1 to 8 was then output in the N/L environment and the reflection densities of the output image were measured.

Then, without changing the adjustment set for the development contrast, the copier unit was held for 3 hours in the H/H environment and a print of an image having patterns 1 to 8 was again output, but in the H/H environment, and the reflection densities of the output image were measured.

The density stability versus changes in the use environment was evaluated using the following criteria based on how many of the reflection densities of the image output in the H/H environment were within the ranges of the reflection densities of the image output in the N/L environment. The reflection density of the images was measured using a Series 500 spectral densitometer (X-Rite, Incorporated).

Patterns

Pattern 1: reflection density of 0.10 to 0.14

Pattern 2: reflection density of 0.25 to 0.29

Pattern 3: reflection density of 0.45 to 0.49

Pattern 4: reflection density of 0.65 to 0.69

Pattern 5: reflection density of 0.85 to 0.89

Pattern 6: reflection density of 1.05 to 1.09

Pattern 7: reflection density of 1.25 to 1.29

Pattern 8: reflection density of 1.48 to 1.52

Evaluation Criteria

AAA: number outside the ranges=0

AA: number outside the ranges=1

A: number outside the ranges=2

B: number outside the ranges=3 to 4

C: number outside the ranges=5 to 6

D: number outside the ranges=7

E: number outside the ranges=8

From a High-Temperature, High-Humidity Environment to a Normal-Temperature, Low-Humidity Environment Using a copier unit that had been held for 72 hours in the H/H environment, the development contrast was adjusted and a setting was established such that the output image assumed the reflection densities of the aforementioned patterns 1 to 8. One print of an image having patterns 1 to 8 was then output in the H/H environment and the reflection densities of the output image were measured.

Then, without changing the adjustment set for the development contrast, the copier unit was held for 3 hours in the N/L environment and a print of an image having patterns 1 to 8 was again output, but in the N/L environment, and the reflection densities of the output image were measured.

The density stability versus changes in the use environment was evaluated using the following criteria based on how many of the reflection densities of the image output in the N/L environment were within the ranges of the reflection densities of the image output in the H/H environment. The reflection density of the images was measured using a Series 500 spectral densitometer (X-Rite, Incorporated).

Evaluation Criteria

AAA: number outside the ranges=0

AA: number outside the ranges=1

A: number outside the ranges=2

B: number outside the ranges=3 to 4

C: number outside the ranges=5 to 6

D: number outside the ranges=7

E: number outside the ranges=8

Evaluation of the Developing Performance Pre-Versus-Post-Continuous Printing

Operating in the N/L environment and fixing the initial Vpp at 1.3 kV, the contrast potential was set so as to provide a reflection density for a cyan monochrome solid image of 1.50. At this setting, 2,000 prints were continuously output of an image pattern for which the ratio of a cyan monochrome image to the paper surface was 1%. Then, a cyan monochrome solid image was again output at a Vpp of 1.3 kV and the image density was measured; the contrast potential was determined at which the reflection density of the cyan monochrome solid image was 1.50; and the difference between initial and post-output was compared. The reflection density was measured using a Series 500 spectral densitometer (X-Rite, Incorporated). A poorer charge retention results in a larger difference between initial and post-output.

Criteria for evaluation of the developing performance:

AAA: the difference between initial and post-output is less than 30 V

AA: the difference between initial and post-output is 30 V or more and less than 35 V A: the difference between initial and post-output is 35 V or more and less than 40 V B: the difference between initial and post-output is 40 V or more and less than 60 V C: the difference between initial and post-output is 60 V or more and less than 80 V D: the difference between initial and post-output is 80 V or more and less than 100 V E: the difference between initial and post-output is 100 V or more The results of these evaluations are given in Tables 5-1 and 5-2. For each of the items evaluated in the preceding, items not receiving a score of E were assessed as good.

Toners 2 to 23 Production Example

Toners 2 to 23 were obtained proceeding as in the Toner 1 Production Example, but changing, as shown in Table 3, the species and content of the silica fine particle and the surface treatment temperature for the toner.

TABLE 3

| | | First external addition treatment | | Surface treatment of toner particle | | Second external addition treatment | | | | | |
|---|---|---|---|---|---|---|---|---|---|---|---|
| Toner | Toner particle | Silica fine particle | Number of parts by mass of silica fine particle | Surface treatment temperature (° C.) | Embedding ratio (%) | Silica fine particle A | Number of parts by mass of silica fine particle A | Silica fine particle B | Number of parts by mass of silica fine particle B | Total amount of external additive in first and second treatments Number of parts by mass of silica fine particle | D4 (μm) |
| 1 | 1 | A1 | 4.00 | 180 | 16 | A1 | 1.60 | B12 | 0.80 | 6.40 | 6.5 |
| 2 | 1 | A2 | 4.00 | 180 | 16 | A2 | 1.60 | B12 | 0.80 | 6.40 | 6.5 |
| 3 | 1 | A3 | 4.00 | 180 | 16 | A3 | 1.60 | B12 | 0.80 | 6.40 | 6.5 |
| 4 | 1 | A3 | 4.00 | 180 | 16 | A3 | 1.40 | B13 | 1.00 | 6.40 | 6.5 |
| 5 | 1 | A3 | 4.00 | 180 | 16 | A3 | 2.40 | — | — | 6.40 | 6.5 |
| 6 | 1 | A3 | 4.00 | 170 | 9 | A3 | 2.40 | — | — | 6.40 | 6.5 |
| 7 | 1 | A3 | 3.40 | 170 | 9 | A3 | 1.00 | — | — | 4.40 | 6.5 |
| 8 | 1 | A3 | 4.40 | TP | 1 or less | — | — | — | — | 4.40 | 6.5 |
| 9 | 1 | A3 | 8.10 | TP | 1 or less | — | — | — | — | 8.10 | 6.5 |
| 10 | 1 | A4 | 8.10 | TP | 1 or less | — | — | — | — | 8.10 | 6.5 |
| 11 | 1 | A5 | 2.90 | TP | 1 or less | — | — | — | — | 2.90 | 6.5 |
| 12 | 1 | A6 | 2.90 | TP | 1 or less | — | — | — | — | 2.90 | 6.5 |
| 13 | 1 | A7 | 2.90 | TP | 1 or less | — | — | — | — | 2.90 | 6.5 |
| 14 | 1 | A8 | 2.90 | TP | 1 or less | — | — | — | — | 2.90 | 6.5 |
| 15 | 1 | A9 | 2.90 | TP | 1 or less | — | — | — | — | 2.90 | 6.5 |
| 16 | 1 | A10 | 2.90 | TP | 1 or less | — | — | — | — | 2.90 | 6.5 |
| 17 | 1 | A11 | 2.90 | TP | 1 or less | — | — | — | — | 2.90 | 6.5 |
| 18 | 1 | 14 | 2.90 | TP | 1 or less | — | — | — | — | 2.90 | 6.5 |
| 19 | 1 | 15 | 2.90 | TP | 1 or less | — | — | — | — | 2.90 | 6.5 |
| 20 | 1 | 16 | 2.90 | TP | 1 or less | — | — | — | — | 2.90 | 6.5 |
| 21 | 1 | 17 | 2.90 | TP | 1 or less | — | — | — | — | 2.90 | 6.5 |
| 22 | 1 | 18 | 2.90 | TP | 1 or less | — | — | — | — | 2.90 | 6.5 |
| 23 | 1 | 19 | 2.90 | TP | 1 or less | — | — | — | — | 2.90 | 6.5 |

In the table, TP indicates "treatment not performed", and the D4 indicates the weight-average particle diameter D4 (.m) of the toner.

Magnetic Carrier 2 Production Example

A magnetic carrier 2 was obtained proceeding as in the Magnetic Carrier 1 Production Example, but changing the material of the coating resin as follows.

| | |
|---|---|
| Cyclohexyl methacrylate monomer | 26.8 mass % |
| Methyl methacrylate monomer | 8.6 mass % |
| Toluene | 31.3 mass % |
| Methyl ethyl ketone | 31.3 mass % |
| Azobisisobutyronitrile | 2.0 mass % |

Magnetic Carrier 3 Production Example

A magnetic carrier 3 was obtained proceeding as in the Magnetic Carrier 1 Production Example, but changing the material of the coating resin as follows.

| | |
|---|---|
| Methyl methacrylate monomer | 35.4 mass % |
| Toluene | 31.3 mass % |
| Methyl ethyl ketone | 31.3 mass % |
| Azobisisobutyronitrile | 2.0 mass % |

Two-Component Developers 2 to 25 Production Example

Two-component developers 2 to 25 were obtained proceeding as in the production example for developer 1, but changing the magnetic carrier and toner as shown in Table 4.

TABLE 4

| Two-component developer | Toner | Magnetic carrier |
|---|---|---|
| 1 | 1 | 1 |
| 2 | 2 | 1 |
| 3 | 3 | 1 |
| 4 | 4 | 1 |
| 5 | 5 | 1 |
| 6 | 5 | 2 |
| 7 | 5 | 3 |
| 8 | 6 | 3 |
| 9 | 7 | 3 |
| 10 | 8 | 3 |
| 11 | 9 | 3 |
| 12 | 10 | 3 |
| 13 | 11 | 3 |
| 14 | 12 | 3 |
| 15 | 13 | 3 |
| 16 | 14 | 3 |
| 17 | 15 | 3 |
| 18 | 16 | 3 |
| 19 | 17 | 3 |
| 20 | 18 | 3 |
| 21 | 19 | 3 |
| 22 | 20 | 3 |
| 23 | 21 | 3 |
| 24 | 22 | 3 |
| 25 | 23 | 3 |

Evaluations

Evaluations were carried out proceeding as in Example 1, but using two-component developers 2 to 25; these were designated Examples 2 to 19 and Comparative Examples 1 to 6. The results of the evaluations are given in Tables 5-1 and 5-2.

TABLE 5-1

| Evaluation | | Temporal stability of printed image | | | | Density stability versus environmental changes Normal-temperature, low-humidity to high-temperature, high-humidity | | | |
|---|---|---|---|---|---|---|---|---|---|
| | | Image-forming speed of 105 prints/min | | Image-forming speed of 85 prints/min | | Image-forming speed of 105 prints/min | | Image-forming speed of 85 prints/min | |
| Ex./C.E. | T.C.D. | Density variation | Evaluation | Density variation | Evaluation | Number outside range (number) | Evaluation | Number outside range (number) | Evaluation |
| Ex. 1 | T.C.D. 1 | 0.04 | A | 0.03 | A | 0 | AAA | 0 | AAA |
| Ex. 2 | T.C.D. 2 | 0.04 | A | 0.03 | A | 0 | AAA | 0 | AAA |
| Ex. 3 | T.C.D. 3 | 0.04 | A | 0.03 | A | 0 | AAA | 0 | AAA |
| Ex. 4 | T.C.D. 4 | 0.04 | A | 0.03 | A | 0 | AAA | 0 | AAA |
| Ex. 5 | T.C.D. 5 | 0.04 | A | 0.03 | A | 0 | AAA | 0 | AAA |
| Ex. 6 | T.C.D. 6 | 0.04 | A | 0.04 | A | 0 | AAA | 0 | AAA |
| Ex. 7 | T.C.D. 7 | 0.05 | A | 0.04 | A | 1 | AA | 1 | AA |
| Ex. 8 | T.C.D. 8 | 0.05 | A | 0.04 | A | 1 | AA | 1 | AA |
| Ex. 9 | T.C.D. 9 | 0.05 | A | 0.04 | A | 1 | AA | 1 | AA |
| Ex. 10 | T.C.D. 10 | 0.05 | A | 0.04 | A | 1 | AA | 1 | AA |
| Ex. 11 | T.C.D. 11 | 0.05 | A | 0.04 | A | 2 | A | 1 | AA |
| Ex. 12 | T.C.D. 12 | 0.05 | A | 0.04 | A | 2 | A | 1 | AA |
| Ex. 13 | T.C.D. 13 | 0.06 | B | 0.04 | A | 4 | B | 1 | AA |
| Ex. 14 | T.C.D. 14 | 0.07 | B | 0.04 | A | 4 | B | 2 | A |
| Ex. 15 | T.C.D. 15 | 0.07 | B | 0.04 | A | 6 | C | 2 | A |
| Ex. 16 | T.C.D. 16 | 0.12 | C | 0.04 | A | 6 | C | 2 | A |
| Ex. 17 | T.C.D. 17 | 0.15 | D | 0.04 | A | 7 | D | 2 | A |
| Ex. 18 | T.C.D. 18 | 0.16 | D | 0.04 | A | 7 | D | 2 | A |
| Ex. 19 | T.C.D. 19 | 0.16 | D | 0.04 | A | 7 | D | 2 | A |
| C.E. 1 | T.C.D. 20 | 0.16 | D | 0.04 | A | 7 | D | 2 | A |
| C.E. 2 | T.C.D. 21 | 0.17 | D | 0.11 | C | 7 | D | 6 | C |
| C.E. 3 | T.C.D. 22 | 0.20 | E | 0.15 | D | 7 | D | 6 | C |
| C.E. 4 | T.C.D. 23 | 0.21 | E | 0.15 | D | 8 | E | 7 | D |
| C.E. 5 | T.C.D. 24 | 0.24 | E | 0.21 | E | 8 | E | 8 | E |
| C.E. 6 | T.C.D. 25 | 0.24 | E | 0.21 | E | 8 | E | 8 | E |

TABLE 5-2

| Evaluation | | Density stability versus environmental changes High-temperature, high-humidity to normal-temperature, low-humidity | | | | Evaluation of developing performance pre-versus-post-continuous printing | | | |
|---|---|---|---|---|---|---|---|---|---|
| | | Image-forming speed of 105 prints/min | | Image-forming speed of 85 prints/min | | Image-forming speed of 105 prints/min | | Image-forming speed of 85 prints/min | |
| Ex./C.E. | T.C.D. | Number outside range (number) | Evaluation | Number outside range (number) | Evaluation | Potential difference from initial (V) | Evaluation | Potential difference from initial (V) | Evaluation |
| Ex. 1 | T.C.D. 1 | 0 | AAA | 0 | AAA | 26 | AAA | 29 | AAA |
| Ex. 2 | T.C.D. 2 | 0 | AAA | 0 | AAA | 29 | AAA | 29 | AAA |
| Ex. 3 | T.C.D. 3 | 0 | AAA | 0 | AAA | 29 | AAA | 29 | AAA |
| Ex. 4 | T.C.D. 4 | 0 | AAA | 0 | AAA | 29 | AAA | 29 | AAA |
| Ex. 5 | T.C.D. 5 | 0 | AAA | 0 | AAA | 29 | AAA | 29 | AAA |
| Ex. 6 | T.C.D. 6 | 0 | AAA | 0 | AAA | 32 | AA | 32 | AA |
| Ex. 7 | T.C.D. 7 | 1 | AA | 0 | AAA | 33 | AA | 33 | AA |
| Ex. 8 | T.C.D. 8 | 1 | AA | 1 | AA | 34 | AA | 33 | AA |
| Ex. 9 | T.C.D. 9 | 2 | A | 1 | AA | 33 | AA | 32 | AA |
| Ex. 10 | T.C.D. 10 | 3 | B | 2 | A | 38 | A | 33 | AA |
| Ex. 11 | T.C.D. 11 | 3 | B | 2 | A | 39 | A | 33 | AA |
| Ex. 12 | T.C.D. 12 | 3 | B | 2 | A | 38 | A | 34 | AA |
| Ex. 13 | T.C.D. 13 | 4 | B | 2 | A | 46 | B | 39 | A |
| Ex. 14 | T.C.D. 14 | 4 | B | 2 | A | 62 | C | 39 | A |
| Ex. 15 | T.C.D. 15 | 4 | B | 2 | A | 65 | C | 38 | A |

TABLE 5-2-continued

| Evaluation | | Density stability versus environmental changes High-temperature, high-humidity to normal-temperature, low-humidity | | | | Evaluation of developing performance pre-versus-post-continuous printing | | | |
|---|---|---|---|---|---|---|---|---|---|
| | | Image-forming speed of 105 prints/min | | Image-forming speed of 85 prints/min | | Image-forming speed of 105 prints/min | | Image-forming speed of 85 prints/min | |
| | | Number outside range | | Number outside range | | Potential difference from initial | | Potential difference from initial | |
| Ex./C.E. | T.C.D. | (number) | Evaluation | (number) | Evaluation | (V) | Evaluation | (V) | Evaluation |
| Ex. 16 | T.C.D. 16 | 5 | C | 2 | A | 75 | C | 37 | A |
| Ex. 17 | T.C.D. 17 | 6 | C | 2 | A | 81 | D | 39 | A |
| Ex. 18 | T.C.D. 18 | 7 | D | 2 | A | 82 | D | 38 | A |
| Ex. 19 | T.C.D. 19 | 7 | D | 2 | A | 93 | D | 38 | A |
| C.E. 1 | T.C.D. 20 | 7 | D | 2 | A | 101 | E | 38 | A |
| C.E. 2 | T.C.D. 21 | 7 | D | 5 | C | 102 | E | 59 | B |
| C.E. 3 | T.C.D. 22 | 7 | D | 5 | C | 104 | E | 93 | D |
| C.E. 4 | T.C.D. 23 | 7 | D | 5 | C | 107 | E | 92 | D |
| C.E. 5 | T.C.D. 24 | 7 | D | 6 | C | 109 | E | 95 | D |
| C.E. 6 | T.C.D. 25 | 8 | E | 7 | D | 111 | E | 98 | D |

In the tables 5-1 an 5-2, Ex. represents Example, C.E. represents Comparative example and T.C.D represents two-component developer.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-075102, filed Apr. 28, 2022 which is hereby incorporated by reference herein in its entirety.

What is claimed is:

1. A toner, comprising:

a toner particle, the toner particle having a weight-average particle diameter of 4.0 to 15.0 μm; and a silica fine particle A on a surface of the toner particle, silica fine particle A having been surface-treated; and $$2 \leq (SD1 + SD2)/SD1 \leq 3.8$$

WD2 is 0.1 to 6.0 ppm $$Ca = (SD1 + SD2)/SQ \times 100$$

$$Cb = (SD1w + SD2w)/SQw \times 100$$

$$(Ca - Cb)/Ca \times 100 \leq 5.0$$

when upon measuring silica fine particle A in a solid-state DD/MAS $^{29}$Si-NMR measurement, a peak PD1 corresponds to a silicon atom indicated by $Si^a$ in a structure according to Formula (1), a peak PD2 corresponds to a silicon atom indicated by $Si^b$ in a structure according to Formula (2), a peak PQ corresponds to a silicon atom indicated by $Si^c$ in a structure according to Formula (3), SD1 is area of the peak PD1, SD2 is area of the peak PD2, SQ is area of the peak PQ, and WD2 is a full width at half maximum of the peak PD2, and upon measuring silica fine particle A in a solid-state DD/MAS $^{29}$Si-NMR measurement after washing thereof with hexane, a peak PD1w corresponds to a silicon atom indicated by $Si^a$ in a structure according to Formula (1), a peak PD2w corresponds to a silicon atom indicated by $Si^b$ in a structure according to Formula (2), a peak PQw corresponds to a silicon atom indicated by $Si^c$ in a structure according to Formula (3), and SD1w is area of the peak PD1w, SD2w is area of the peak PD2w, and SQw is area of the peak PQw (1)

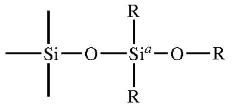

(2)

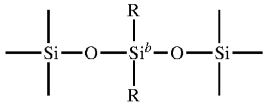

(3)

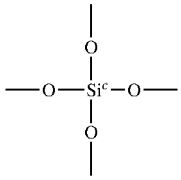

when R independently represents a hydrogen atom, methyl group or ethyl group.

2. The toner according to claim 1, wherein (SD1+SD2)/SD1 is 1.5 to 3.0.

3. The toner according to claim 1, wherein WD2 is 1.0 to 4.0 ppm.

4. The toner according to claim 1, wherein (SD1+SD2)/SQ×100≥1.0.

5. The toner according to claim 1, wherein silica fine particle A has a number-average primary particle diameter of 5 to 500 nm.

6. The toner according to claim 5, wherein silica fine particle A has a number-average primary particle diameter of 50 to 300 nm.

7. The toner according to claim 1, wherein silica fine particle A adsorbs 0.010 to 0.100 $cm^3/m^2$ of moisture per 1 $m^2$ of BET specific surface area at a temperature of 30° C. and a relative humidity of 80%.

8. The toner according to claim 1, wherein a content of silica fine particle A is 0.01 to 10.00 parts by mass relative to 100 parts by mass of the toner particle.

9. The toner according to claim 1, wherein a portion of silica fine particle A is embedded in the toner particle and an embedding ratio of the silica fine particle A in the toner particle is 5 to 50%.

10. The toner according to claim 1, wherein silica fine particle A comprises at a surface thereof a siloxane structure-bearing compound.

11. The toner according to claim 1, comprising a silica fine particle B at the surface of the toner particle, wherein silica fine particle B is silicone oil-treated.

12. The toner according to claim 11, wherein silica fine particle B has a number-average primary particle diameter of 5 to 25 nm.

13. The toner according to claim 12, wherein the number-average primary particle diameter of silica fine particle B is at least 50 nm smaller than a number-average primary particle diameter of silica fine particle A.

14. The toner according to claim 1, wherein silica fine particle A is a silica fine particle provided by mixing a silica fine particle substrate with a cyclic siloxane and carrying out a heat treatment at a temperature of 300 to 380° C.

15. A method for producing the toner according to claim 1, the method comprising the steps of:

mixing a silica fine particle substrate and a cyclic siloxane and carrying out a heat treatment at a temperature of 300 to 380° C. and 380° C. to produce silica fine particle A; and mixing silica fine particle A with the toner particle.

16. A two-component developer, comprising:

the toner according to claim 1; and a magnetic carrier comprising a magnetic carrier core particle and a resin-coating layer on a surface of the magnetic carrier core particle, wherein the resin in the resin-coating layer contains a monomer unit provided by a (meth)acrylate ester having an alicyclic hydrocarbon group.

17. The two-component developer according to claim 16, wherein the resin in the resin-coating layer comprises a monomer unit provided by a macromonomer according to Formula (B);

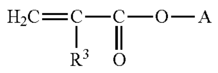

(B)

where $R^3$ is H or $CH_3$, and A represents a polymer of at least one compound selected from the group consisting of methyl acrylate, methyl methacrylate, butyl acrylate, butyl methacrylate, 2-ethylhexyl acrylate, 2-ethylhexyl methacrylate, styrene, acrylonitrile and methacrylonitrile.

* * * * *